(12) United States Patent
Lee et al.

(10) Patent No.: US 9,417,697 B2
(45) Date of Patent: Aug. 16, 2016

(54) 3D TRANSLATOR DEVICE

(71) Applicant: QUALCOMM Incorporated, San Diego, CA (US)

(72) Inventors: Arthur C. Lee, San Diego, CA (US); Mark Aaron Lindner, Verona, WI (US); Michael P. Mahan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 13/790,796

(22) Filed: Mar. 8, 2013

(65) Prior Publication Data

US 2014/0253687 A1  Sep. 11, 2014

(51) Int. Cl.
*G06F 3/00* (2006.01)
*G06F 3/01* (2006.01)
*G06F 3/0488* (2013.01)
*G06F 3/041* (2006.01)

(52) U.S. Cl.
CPC .............. *G06F 3/016* (2013.01); *G06F 3/041* (2013.01); *G06F 3/0488* (2013.01)

(58) Field of Classification Search
CPC ........ G06F 3/016; G06F 3/041; G06F 3/0488
USPC .......................................................... 348/46
See application file for complete search history.

(56) References Cited

U.S. PATENT DOCUMENTS

| | | | |
|---|---|---|---|
| 8,204,299 B2 | 6/2012 | Arcas et al. | |
| 8,232,990 B2 | 7/2012 | King et al. | |
| 2010/0241999 A1 | 9/2010 | Russ et al. | |
| 2011/0246877 A1 | 10/2011 | Kwak et al. | |
| 2013/0249975 A1* | 9/2013 | Davie | G06F 3/016 345/698 |

FOREIGN PATENT DOCUMENTS

KR   20110080573 A   7/2011

OTHER PUBLICATIONS

Patently Apple, "Apple Reveals Wildly Intelligent Multi-Tiered Haptics System", Patently Apple, May 2012, 10 pgs.

* cited by examiner

*Primary Examiner* — Jeffery Williams
(74) *Attorney, Agent, or Firm* — The Marbury Law Group, PLLC

(57) ABSTRACT

Various embodiments include a three-dimensional (3D) translator device for translating two-dimensional (2D) visual imagery into 3D physical representations that users can feel with their fingers and thus interact with and experience physically. The 3D translator device may enable users to feel/interact with 2D images displayed on devices such as 2D touchscreen devices by translating the 2D images into a 3D touch surface coordinate data set. The 3D translator device may actuate based on the 3D touch surface coordinate data set so that the users can feel the 3D representation of the 2D images, and translating the users' touches on the 3D translator device's 3D touchpanel into touch inputs that can be processed by a 2D touchscreen device (i.e., "2D touch inputs).

51 Claims, 18 Drawing Sheets

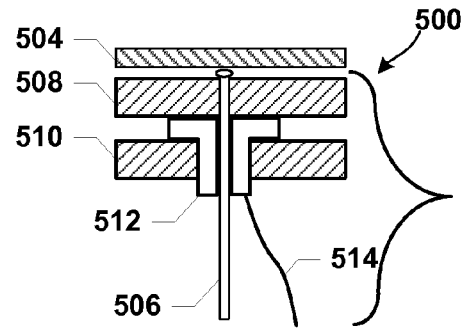 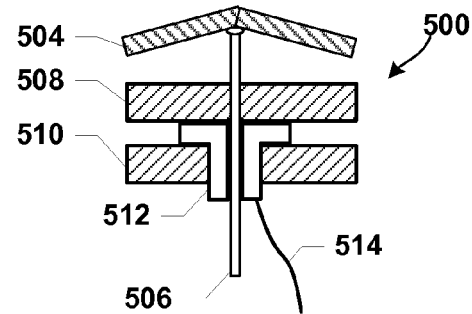
FIG. 5A  FIG. 5B
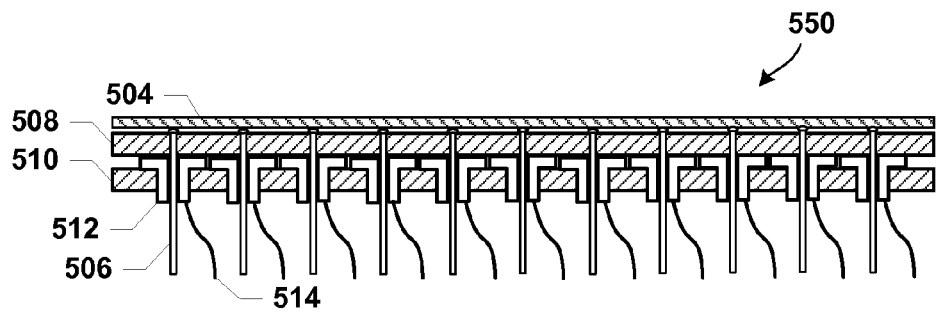
FIG. 5C
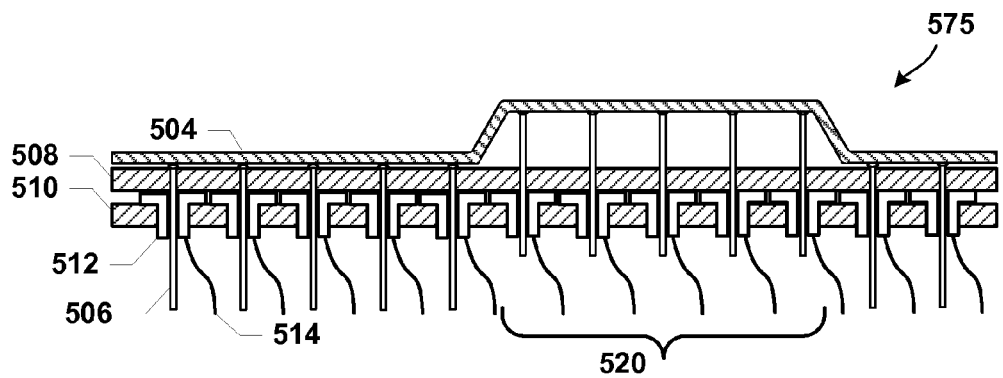
FIG. 5D

3D TRANSLATOR DEVICE

BACKGROUND

Most individuals primarily experience the world through sight, and consequently, an overwhelming amount of information, entertainment, and communications are only conveyed visually. For example, most individuals experience the Internet primarily through sight by viewing web pages.

The prevalence of communication and information on the Internet has been a boon for almost every person with access to it. Unfortunately, individuals with visual impairments (e.g., those with difficulty seeing or complete blindness) are severely hampered in their ability to experience and interact with many common online features because the content on the Internet is almost entirely visual in nature. Thus, visually impaired individuals may be unable to experience much of what the Internet has to offer. While some webpages implement functionality to improve web-based experiences for the visually impaired, there is no current way to convey all of the content displayed even on those websites that accommodate the visually impaired.

This problem extends to the non-Internet world as well. For example, innumerable written documents, pictures and letters are created every day, and almost none of these items are perceptible or readable by the seeing impaired today. Accordingly, there is a need to translate visual media, either from the Internet or in the real world, into a form in which the visually impaired may experience.

SUMMARY

The various embodiments include a three-dimensional (3D) translator device and methods for translating two-dimensional (2D) visual images into three-dimensional physical representations on the 3D translator device that users can feel with their fingers and thus interact with and experience physically. The 3D translator device may enable users to feel and interact with 2D images displayed on devices, such as 2D touchscreen devices by translating the 2D images into a 3D touch surface coordinate data set. The 3D translator device may actuate a three-dimensional (3D) touchpanel based on the 3D touch surface coordinate data set so that the users can feel the 3D representation of the 2D images.

In an embodiment, the 3D translator device may use photographic sensors (e.g., cameras, pixel sensors, stereographic sensors) to capture a 2D image from various sources, including paper documents, digital displays, and photographs. The 3D translator device may translate the captured 2D image into a 3D touch surface coordinate data set using various techniques, such as producing a topological rendering of a color histogram of the captured 2D image, performing edge detection on the capture 2D image, or using stereoscopic sensors to obtain three-dimensional offset images of the captured 2D image. The 3D translator device may use the 3D touch surface coordinate data set to actuate the 3D touchpanel into a 3D representation of the captured 2D image.

In an embodiment, the 3D translator device may receive 2D images from a two-dimensional (2D) touchscreen device. The 3D translator device may indirectly receive a 2D image from the 2D touchscreen device by using photographic sensors to capture the 2D image displayed on the 2D touchscreen device's display panel. In another embodiment, the 3D translator device may directly receive 2D images from the 2D touchscreen device through a wired or wireless data connection (e.g., a Bluetooth connection). For example, the 2D translator device may access a web site and transmit a 2D image to the 3D translator device as webpage data.

In another embodiment, a 2D image in the form of webpage data may include specialized 3D meta-elements that the 3D translator device may use to actuate its 3D touchpanel into a 3D representation of the 2D images. For example, the 3D meta-elements may include information the 3D translator device may use to create a 3D touch surface coordinate data set for use in actuating the 3D touchpanel. In another embodiment, the 2D image may include 3D cascading style sheet (CSS) information that may provide additional information to the 3D translator device for use in either creating a 3D touch surface coordinate data set or actuating the 3D touchpanel into a 3D representation of the 2D image.

In another embodiment in which the 3D translator device functions in conjunction with a 2D touchscreen device, the 3D translator device may receive a user's touch input on the 3D touchpanel (i.e., a 3D touch input). The 3D translator device may use various techniques to convert the 3D touch input received on the 3D touchpanel into a touch input. For example, the 3D translator device may determine the location on a 2D touchscreen device's touchpanel that corresponds with the location on the 3D touchpanel that received a 3D touch input. In another embodiment, the 3D translator device may communicate the 2D touch input to the 2D touchscreen device, for instance, by indirectly creating an artificial 2D touch input event on the 2D touchscreen or by directly communicating the 2D touch input to the 2D touchscreen device over a wired or wireless connection.

BRIEF DESCRIPTION OF THE DRAWINGS

The accompanying drawings, which are incorporated herein and constitute part of this specification, illustrate embodiments of the invention, and together with the general description given above and the detailed description given below, serve to explain the features of the invention.

FIGS. 5A-5D are cross-sectional views of example 3D touchpanel actuators for use with the various embodiments.

DETAILED DESCRIPTION

Figure 1:
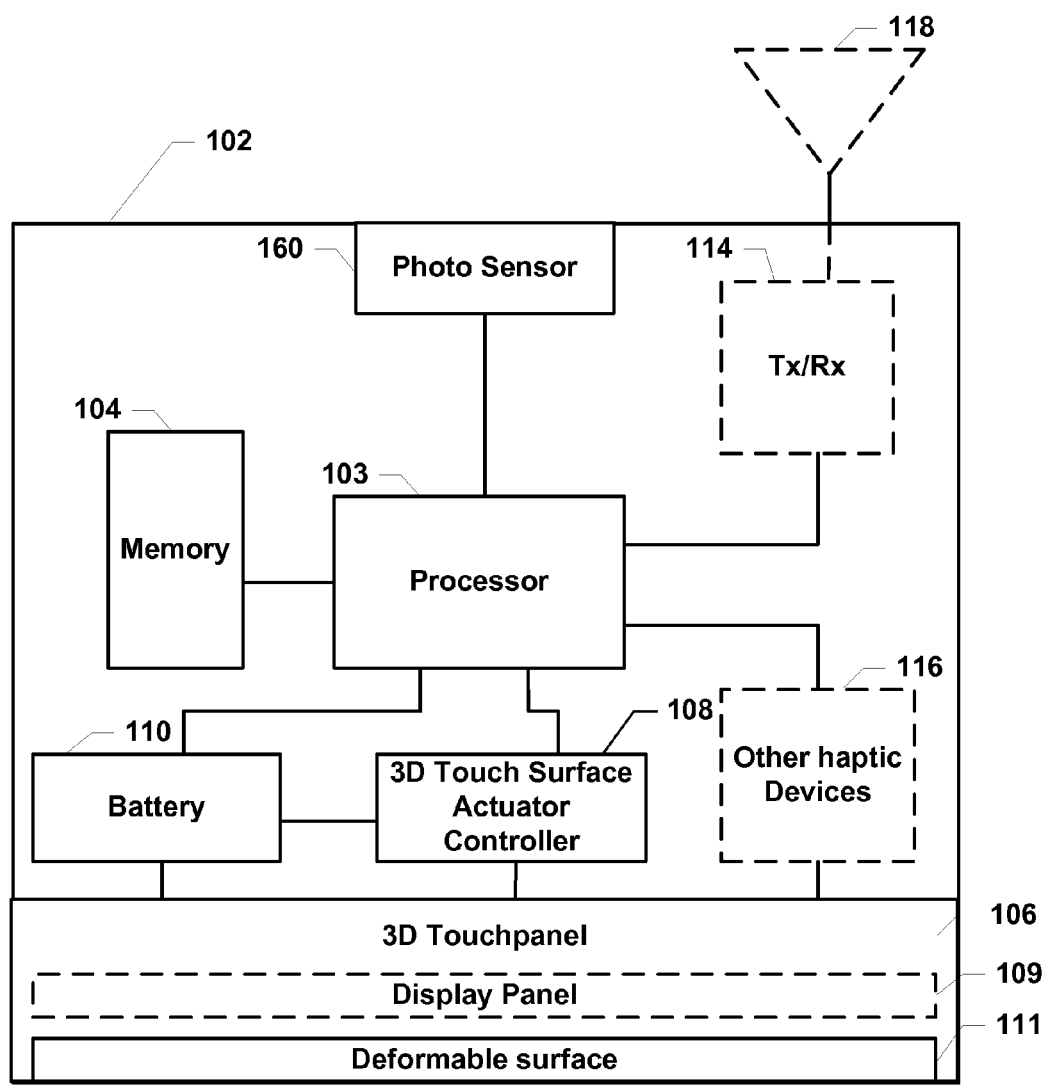
FIG. 1 is a component block diagram of an embodiment 3D translator device.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include a 3D translator device for translating webpages, images, and other two-dimensional visual imagery (collectively "2D images") into three-dimensional physical representations that users (especially visually impaired individuals) can feel with their fingers and thus interact with and experience physically. In various embodiments, the 3D translator device may enable users to feel/interact with 2D images displayed on devices such as 2D touchscreen devices by translating the 2D images into a 3D touch surface coordinate data set, actuating the 3D touchpanel based on the 3D touch surface coordinate data set so that the users can feel the 3D representation of the 2D images, and translating the users' touches on the 3D translator device's 3D touchpanel (i.e., "3D touch inputs") into touch inputs that can be processed by a 2D touchscreen device (i.e., "2D touch inputs). The various embodiments may, therefore, enable users (especially visually-impaired individuals) to experience 2D images and to interact with use graphical user interfaces on devices such as 2D touchscreen devices.

As used herein, the term "2D device" is used to refer to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices that include a programmable processor, memory, and a 2D display. As used herein, the term "2D touchscreen device" refers to a 2D device that includes a touchscreen panel for receiving 2D touch inputs from a user.

As used herein, the term "3D touchpanel" refers to various embodiments that are configured to communicate information by generating a surface feature (i.e., a "3D shape") that can be felt by a user, such as through the finger tips. The various embodiments include 3D touchpanels configured to raise a portion of a deformable surface to create a bump or raised portion that can be felt. A 3D touchpanel may use piezoelectric pins driven by motors to raise areas of the deformable surface into various shapes. For example, the 3D touchpanel may actuate a portion of the deformable surface into the shape of a cube to represent a 2D image that is a square.

As used herein, the term "tixel" (from the contraction of "texture" and "pixel") refers to a smallest portion of a 3D touchpanel that can be activated individually. For example, a 3D touchpanel made up of a plurality of tixels may be configured such that tixels are arranged in a two-dimensional grid or array conceptually similar to pixels in a visual display. By individually actuating tixels, a 3D translator device processor can generate a tactile pattern that communicates information to a user via the user's sense of touch. Reference to tixels in the various embodiments described herein is made merely as one example of a 3D touchpanel that may be used, and is not intended to limit the embodiments or claim elements.

As used herein, a "touch input" refers to a detected user input received on a touchscreen device, which may include finger presses. For example, a touch input may refer to the detection of a user touching the device with one or more fingers. As also used herein, a "2D touch input" refers to touch inputs received on a 2D touchscreen device. Additionally, as used herein, a "3D touch input" refers to touch inputs received on the 3D touchpanel of a 3D translator device. For example, the 3D translator device may receive a 3D touch input when the user presses a raised portion of the 3D translator device's deformable surface.

In the various embodiments, a 3D translator device may include a processor, memory, and a touch surface panel (i.e., a "3D touchpanel"). The 3D touchpanel may include a deformable surface configured to morph into a 3D representation of 2D images (i.e., 3D shapes). The 3D touchpanel may also be configured to receive 3D touch inputs. The 3D translator device may also include one or more photographic sensors (e.g., a digital camera, stereoscopic photographic sensors, or an array of pixel sensors) for capturing 2D images, such as text in a book or a picture in a magazine.

In some embodiments, the 3D translator device may also include a display panel positioned underneath the 3D touchpanel for displaying the 2D images that are represented as 3D shapes on the 3D touchpanel. In these embodiments, the 3D touchpanel may include transparent elements (e.g., transparent piezoelectric pins) that may allow the 2D images displayed on the 3D translator device's display panel to be visible, similar to the composition of a 2D touchscreen device in which a user may interact with the touchscreen panel based on the images rendered on the display panel beneath the touchscreen panel. For example, in the case in which the 3D translator device uses a camera to capture a 2D image, the 2D image may be displayed on the screen beneath the transparent 3D touchpanel, thereby allowing the user both to see and to feel the 3D shape crated on the 3D touchpanel.

In an embodiment, the 3D touchpanel may include actuators (e.g., piezoelectric or hydraulic elements) configured to cause portions of a 3D touchpanel (i.e., tixels) to become raised when activated. For example, the surface may include piezoelectric actuators to cause raised bumps when energized. As another example, the tixels may be raised by a plurality of pins individually driven by linear actuator motors.

In this embodiment, a tixel actuator may vertically displace a pliable, deformable surface layer vertically using an underlying pin that is held in place laterally by parallel plates and driven vertically by an actuator motor. The actuator motor may be any suitable linear actuator, including linear piezoelectric actuators, solenoid actuators, linear motors, linear stepper motors, etc. Each actuator motor may be driven by an individual electric signal, such as is delivered by a connector which may be coupled to a processor within the 3D touchscreen device. The deformable surface may lie flat when de-energized and may rise up when energized. As another example, tixels may be hydraulically actuated blisters that can be individually expanded by controlling fluid (e.g., gas or liquid) pressure within each blister.

In various embodiments, a plurality of the tixel actuators included within the 3D touchpanel may be closely spaced and configured as an array of tixels. Such a configuration may enable actuation of different portions of the 3D touchpanel in response to individual signals applied by the processor in order to create 3D shapes on the deformable surface of different shapes and sizes. In an embodiment, the array of tixels may be represented by a 3D touch surface coordinate data set that may include information the 3D translator device may use to actuate a tixel at a particular location in the array. In other words, the 3D touch surface coordinate data set may include information that includes the location of one or more tixels in the array (i.e., the tixels' "x" and "y" coordinate values), as well as the degree of actuation of those tactile elements (i.e., the height or "z" coordinate values).

In an example embodiment, an individual tixel may have assigned a z-coordinate value of either 1 (i.e., "raised") or 0 (i.e., "lowered"), thereby creating a 1-bit per tixel "tixmap". The tixmap may be stored in a tactile output buffer similar to a display buffer used for generating images on a visual display. In another embodiment, individual tixels may be capable of more than one output setting (similar to how pixels may vary in brightness and color). For example, a tixel based on an actuator, piezoelectric crystal or electroactive polymer may be able to generate raised "bumps" within a range of heights (i.e., z-coordinate values).

In an embodiment, a processor may control the height of such tactile elements by assigning a z-coordinate value to the tixel based on a 3D touch surface coordinate data set, such that the z-coordinate value corresponds to the relative height to which the element should be raised or some other degree of actuation. The 3D touchscreen device may, therefore, use the 3D touch surface coordinate data set to organize or configure the tactile element actuators to be individually energized and arranged within an array in order to form a wide variety of different shapes.

In a further embodiment, multiple types of tactile modalities may be implemented on a given tixel, such as elevation and vibration (e.g., by applying an alternating current with a bias to a piezoelectric element), elevation and electrostatic, elevation and thermal, vibration and electrostatic, vibration and thermal, and electrostatic and thermal. In such embodiments, the data in the 3D touch surface coordinate data set may indicate actuation of a tactile element, plus the specific modality and magnitude to be implemented. For example, a higher z-coordinate value may cause a particular tixel to rise higher and vibrate more intensely than a lower z-coordinate value. In an embodiment, such additional tactile modalities (e.g., temperature, vibration, and/or electrostatic charge) may be used to communicate visual information other than shape, such as color and/or brightening.

In order to output tactile information on a tixel array, a processor or dedicated tactile output circuitry may read the values stored in a 3D touch surface coordinate data set for each tixel address (i.e., each tixel's x, y, z coordinate) and send actuation signals to each tixel accordingly. The processor or tactile output circuitry may generate activation signals, such as corresponding to an "on" value, for selected tixels within the tixel array. In this manner, multiple activated tixels within a tixel array may be activated to create a variety of 3D shapes of different sizes on a 3D touchpanel. Similar techniques may be used to actuate other tactile modalities (e.g., temperature, vibration, and/or electrostatic charge).

In various embodiments, multiple tixels may be activated in patterns or groups on a 3D touchpanel to communicate information to a user regarding a 2D image. Users may perceive the information by feeling the tactile characteristic (e.g., shape, size, etc.) of the activated portions of the 3D touchpanel. By correlating the dimensions, shapes and other characteristic to the information to be communicated, relatively sophisticated imagery information can be communicated to users.

In various embodiments, the 3D translator device may translate a 2D image into raised and lowered portions of a 3D touchpanel to create a 3D shape representative of the 2D image. In an embodiment, a camera or other photographic sensor included in the 3D translator device may obtain a 2D image, such as a graphic displayed on a 2D device, an image on a newspaper, or a block of text in a paper document. For example, the 3D translator device may use its camera to photograph a text document, which may be analyzed by a processor to extract image information. In an embodiment, the 3D translator device may process the captured 2D image to determine the position and shape of lines within the 2D image. The 3D translator device may translate the determined lines into a 3D touch surface coordinate data set that it may use to send actuation signals to the 3D touchpanel to cause the 3D touchpanel to raise or lower the 3D touchpanel to generate 3D shapes representative of the captured 2D image. For example, the 3D translator device may capture a 2D image of a ball displayed on a 2D device, translate the captured 2D image of the ball into a 3D touch surface coordinate data set, and raise a plurality of pins in a matrix to various heights based on the 3D touch surface coordinate data set to form a 3D representation of the 2D image of the ball. In this example, the 3D translator device may cause the 3D touchpanel to morph into a dome-shaped 3D shape.

In an embodiment, the 3D translator device may use the photographic information of a 2D image obtained with its camera(s) or other photographic sensor(s) to produce color histograms of the 2D image. In this embodiment, the 3D translator device may associate different colors with different degrees of heights for use in determining how high to raise or lower a particular tixel. The 3D translator device may thus generate a topological rendering of the color histograms of the 2D image based on the colors in the image. The 3D translator device may also translate the topological rendering into a 3D touch screen coordinate data set by mapping the color value associated with a tixel to a particular height (i.e., z-coordinate value). For example, the 3D touchpanel may represent a 2D image that transitions from a light blue to a dark blue from left to right by increasingly actuating (e.g., raising) the 3D touchpanel from left to right (i.e., the darker the blue, the higher the 3D panel raises the deformable surface). In another embodiment, the processor may use the color histogram to selectively actuate other tactile modalities, such as temperature, vibration, and/or electrostatic charge applied to each tixel.

In another embodiment, the 3D translator device may use the photographic information of a 2D image obtained with its photographic sensors to perform edge detection of the 2D image. By performing edge detection, the 3D translator device may determine the boundaries or "edges" in the 2D image and may associate those edges with a greater height than the non-edge features of the 2D image. In this embodiment, the 3D translator device may determine the edges of a 2D image, associate those edges with one or more tixels, and create a 3D touch surface coordinate data set reflecting the greater z-coordinate value of those tixels associated with the edges. The 3D translator device may then actuate the 3D touchpanel based on the 3D touch surface coordinate data set, such that the tixels associated with the edges will be raised higher than non-edge tixels. For example, the 3D translator device may determine the edges of a 2D image of a star and raise tixels associated with those edges to form a raised outline of a star on the 3D touchpanel.

In yet another embodiment, the 3D translator device may utilize stereoscopic cameras to capture offset 2D images of a real-world three-dimensional object. In this embodiment, the 3D translator device may analyze the offset 2D images to determine height characteristics of the real-world three-dimensional object according to well known procedures. The 3D translator device may translate the height characteristics into z-coordinate values that are assigned to one or more tixels as part of the 3D touch surface coordinate data set. The 3D translator may then use the 3D touch surface coordinate data set to actuate the tixels based on their z-coordinate values to deform the 3D touchpanel into a 3D shape representing the real-world three-dimensional object. For example, the 3D translator device's stereoscopic cameras may capture offset 2D images of a real-world cube, determine the height of the cube using the offset 2D images of the cube, create a 3D touch surface coordinate data set based on the determined heights, and actuate the 3D touchpanel based on the 3D touch surface coordinate data set. In this example, the 3D translator device may deform the deformable surface on the 3D touchpanel into a cube that represents the real-world cube.

In various embodiments, the 3D translator device may function together with a 2D touchscreen device (e.g., a tablet computer) or other computing device. In an embodiment, the 3D translator device may be positioned over the 2D device's display panel such that the 3D translator device's photographic sensors are able to capture the 2D images displayed on the 2D device's display panel. In another embodiment, instead of a camera, the photographic sensors may be a matrix of small light sensors each configured to sense an amount of light corresponding to a particular pixel. Since the 3D translator device rests on top of an illuminated display panel, the matrix of small light sensors can obtain sufficient image data to measure the characteristics of individual pixels or groups of pixels displayed on the 2D touchscreen device's display panel. In a further embodiment, the 3D translator device may include lights (e.g., light-emitting diodes) for illuminating the 2D image that the photographic sensor is to capture. For example, the lights may illuminate a paper document in low-light to enable the 3D translator device's camera to capture the details of the paper document.

In some embodiments, instead of imaging what is displayed on the 2D touchscreen device's display panel, the 3D translator device may receive 2D image data directly from a browser operating on the 2D touchscreen device or other computing device through a wired or wireless (e.g., WiFi or Bluetooth) connection. The browser data may include meta-data about the webpages displayed on the browser, such as various tags, style-sheet information, and other markup language information.

In a further embodiment, a browser plug-in may be installed on the 2D device to enable the 2D device's browser to communicate relevant or specialized browser information (e.g., 3D meta-elements) to the 3D translator device for use in forming 3D shapes on the 3D touchpanel based on the 2D images displayed on the browser. For instance, the 3D translator device may receive 3D meta-elements from a browser operating on a 2D device that has installed a 3D browser plug-in. The 3D translator device may recognize and use the 3D meta-elements when creating a 3D touch surface coordinate data set used. In an embodiment, 3D meta-elements may be meta-elements embedded in a webpage displayed on a browser, for example, that provide specialized display information (e.g., 3D touch surface coordinate data) that may enable the 3D translator device to form 3D shapes on the 3D touchpanel. For example, the 3D meta-elements may describe the 3D characteristics of a particular 2D image displayed on the browser (e.g., the height, length, and width of a button). In this example, the 3D translator device may utilize the 3D meta-elements to form 3D shapes on the 3D touchpanel based on the 3D characteristics of the 2D image.

In another embodiment, the 3D meta-elements may themselves be 3D touch surface coordinate data (e.g., x, y, z coordinate values) that the 3D translator device may use to actuate the 3D touchpanel. For example, the 3D meta-elements may include the location (i.e., the x, y coordinates pair value) of a one or more tixels to be actuated and the degree to which those tixel are to be actuated (e.g., the z coordinate value). In another embodiment, the 3D meta-elements may be implemented as meta-tags (e.g., alt-tags) or specialized cascading style sheets ("CSS") that provide 3D style characteristics (i.e., the 3D characteristics of buttons, paragraphs, etc.).

In another embodiment, the 3D meta-elements may configure the browser operating on the 2D device to display certain 2D images that provide the 3D translator device with additional information for use in translating 2D images into 3D shapes. For example, the 3D meta-elements may prompt the browser to display a particular image that the 3D translator device may recognize (e.g., a standardized representation of a button or scroll bar). As another example, the 3D meta-elements may include a link to an online repository that contains particular instructions for rendering 3D representations of complex 2D shapes. In a further example, the 3D meta-elements may include an image in a color undetectable by the human eye but detectable by the 3D translator device's camera that conveys additional 3D rendering information for use by the 3D translator. An image detectable only by the 3D translator device's camera may be a link (e.g., a Quick Response code) to an online repository to which the 3D translator device may link to obtain instructions regarding how to render a complex shape, pattern, or animation. In another embodiment, the 3D meta-elements and the browser plug-in may enable websites to communicate with the 3D translator device to facilitate representing 2D images on the 3D touchpanel.

In an embodiment, the 3D translator device may directly function as a browser consistent with the various embodiments described above. In this embodiment, the 3D translator device may receive website information (e.g., html, CSS, meta-data) from another computing device or directly from a network, such as the Internet.

In various embodiments, the 3D translator device may receive and recognize 3D touch inputs on the 3D touchpanel as interactions with GUI elements, which the 3D translator device may communicate to a 2D touchscreen device. In this embodiment, the 3D translator device may translate 3D touch inputs received on the 3D touchpanel into 2D touch inputs that are communicated to a 2D touchscreen device. In an embodiment, the 3D translator device may include an array of mechanical "fingers" or styluses on the bottom of the 3D translator device. The mechanical fingers may act as a proxy for the user's finger, so that the mechanical finger may touch the 2D touchscreen device's touchscreen panel at the location that corresponds with the location on the 3D touchpanel that the user touched. The mechanical finger may be used in conjunction with the camera-based implementation of the 3D translator device to enable the rendering of 3D imagery without the 3D translator device having to communicate directly with the 2D touchscreen device. For example, if the user presses a button raised on the 3D touchpanel that corresponds with a 2D button displayed on the 2D touchscreen device's display panel, the 3D translator device may cause the mechanical finger (or fingers) located above the 2D button to press the 2D button. In a further embodiment, the mechanical fingers may include various attachments, such as a pen for marking up paper documents.

In another embodiment, the 3D translator device may translate 3D touch inputs received on the 3D touchpanel into 2D touch inputs for use by a 2D touchscreen device by affecting the electrical properties of the corresponding area of the 2D touchscreen device's touchscreen panel (i.e., "e-stim"). In an embodiment, e-stim may include changing the electrical properties of the underside of the 3D translator device, which is in close proximity to the touchscreen panel, to affect the electrical properties of the touchscreen panel near the stimulated location of the 3D translator device. By changing the electrical properties at a particular location on the 2D touchscreen device's touchscreen panel, the 3D translator device may create an artificial 2D touch input.

In an embodiment, the 3D translator device may be in communication with a 2D touchscreen device, either through a wired or wireless link over which it may transmit the touch input information received on the 3D touchpanel to the 2D touchscreen device. The 2D touchscreen device may then implement the appropriate response to the touch input. For example, the 3D translator device may receive a particular 3D touch gesture (e.g., a pinch-to-zoom command) on the 3D touchpanel. The 3D translator device may then translate the 3D touch gesture into a 2D touch gesture and send the converted 2D touch gesture to the 2D touchscreen device over the data link for implementation on the 2D touchscreen device.

FIG. 1 is a component block diagram of a 3D translator device 102 suitable for use with the various aspects. In the various embodiments, the 3D translator device 102 may include a processor 103. The processor 103 may be a multi-core host processor that may be distinct from a surface actuator controller 108. The processor 103 may be any of a variety of programmable processors capable of running applications and an operating system for managing such applications. For example, the processor 103 may persistently execute a high level operating system (HLOS) that may perform numerous routines to utilize the components and software of the 3D translator device 102. The processor 103 may also store data within and retrieve data from a memory component 104 that may be external and/or on-chip memory.

The 3D translator device 102 may further include a 3D touchpanel 106 (and associated drivers) configured to render various 3D shapes on a deformable surface 111 as described in further detail below in relation to FIGS. 5A-5D. For example, the 3D touchpanel 106 may be capable of morphing the deformable surface 111 to render 3D shapes of 2D images. The processor 103 may control the 3D touchpanel 106 by transmitting data via a surface actuator controller 108 component, which may translate or process data for rendering by the 3D touchpanel 106. In another embodiment, the 3D touchpanel 106 may optionally include a display panel 109 for displaying the 2D images that are represented as 3D shapes on the deformable surface 111. For example, the display panel 109 may display the 2D images that are captured with the photographic sensors 160 positioned on the bottom of the 3D translator device 102.

In various embodiments, the processor 103 may receive data from the surface actuator controller 108, which is capable of being utilized by the various applications executed on the processor 103. In an embodiment, the processor 103 may be configured to receive 3D touch inputs data from the 3D touch surface actuator controller 108 to enable the processor to process 3D touch inputs. For example, the 3D translator device 102 may include a data path that directs raw 3D touch inputs to the processor 103. In an optional aspect, the processor 103 may optionally be coupled to other haptic devices 116, such as devices configured to cause certain locations on the 3D touchpanel 106 to vibrate. Additionally, the 3D translator device 102 may optionally have one or more antenna 118 for sending and receiving electromagnetic radiation that may be connected to an optional wireless data link and/or an optional cellular telephone transceiver 114 coupled to the processor 103. The 3D translator device 102 may also include a power source, such as a battery 110, that may provide power to various components of the 3D translator device 102, including the processor 103, the 3D touch surface actuator controller 108, and the 3D touchpanel 106.

In various embodiments, the 3D translator device 102 may also include one or more photographic sensors 160 for capturing photographic information of 2D images for use in rendering 3D shapes on the 3D touchpanel 106. In an embodiment, the photographic sensors 160 may be cameras that may capture any 2D image. In another embodiment, the photographic sensors 160 may be specialized pixel or light sensors configured to capture 2D images from digital displays, such as the display on a 2D touchscreen device or another mobile computing device (e.g., a smart phone, tablet, etc.).

The 3D translator device 102 may also include other components not shown in FIG. 1, such as application data movers for transferring various data from the processor 103, a graphic processing unit (GPU) that process and generate data related to multimedia, and display-processors and/or controllers that may communicate display commands from the processor 103 to a display interface.

Figure 2:
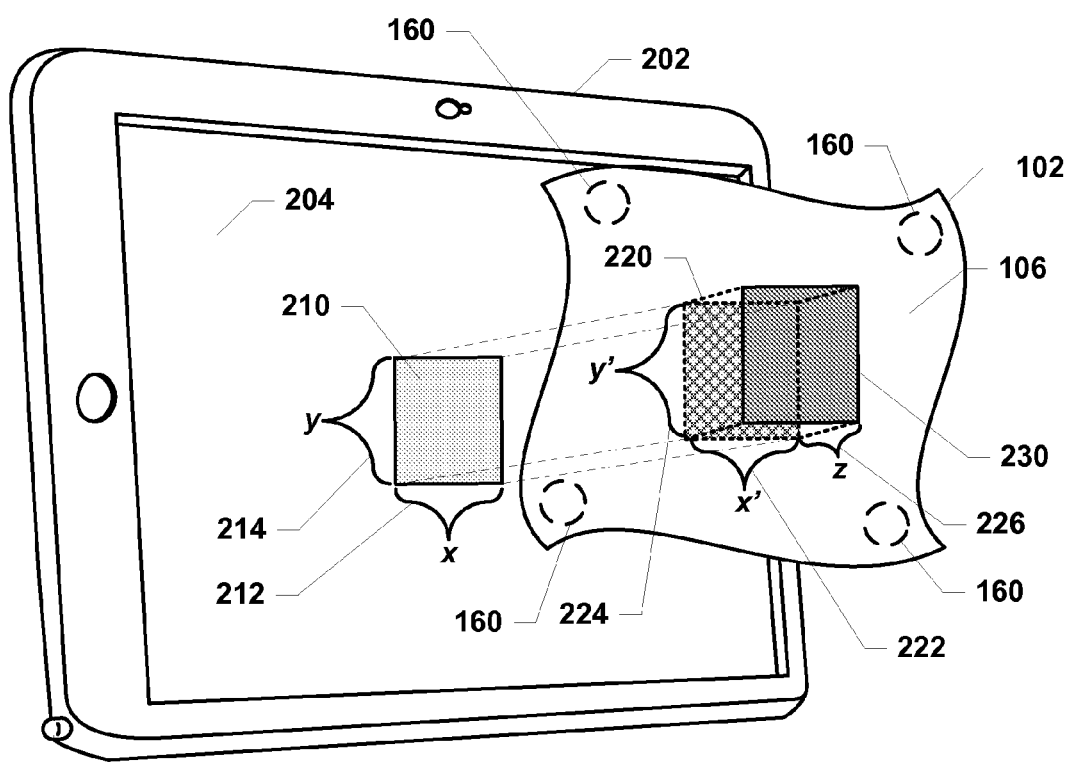
FIG. 2 is an illustration of an embodiment 3D translator device transforming a 2D image on a 2D touchscreen device into a 3D representation.

FIG. 2 illustrates an embodiment 3D translator device 102 actuating a deformable surface included in a 3D touchpanel 106 into a 3D shape 230 that represents a 2D image 210 underneath. In various embodiments, the 3D translator device 102 may function in conjunction with a 2D touchscreen device 202. The 2D touchscreen device 202 may include a display panel 204 that is configured to display 2D images 210. For example, the display panel 204 may display a 2D image 210 of various objects, such as a webpage.

In some embodiments, as illustrated in FIG. 2, the 3D translator device 102 may be positioned over the display panel 204 of a 2D touchscreen device 202 such that the 3D translator device 102's photographic sensors 160 are capable of imaging 2D images 210 displayed on the display panel 204. In an embodiment, the photographic sensors 160 may be positioned on the bottom of the 3D translator device 102 (i.e., closest to the 2D imagery to be captured), and a 3D touchpanel 106 may be positioned on top of the 3D translator device (i.e., positioned closest to the user).

In an embodiment, after receiving the 2D image 210 from the photographic sensors 160 (or from another source, such as directly from the 2D touchscreen device 202), the 3D translator device may determine various image characteristics of the 2D image 210, such as the shape, size, colors, and relative location of the 2D image 210. For example, the 3D translator device 102 may determine that the 2D image 210 has a width 212 of x (e.g., x pixels, inches, centimeters, etc.) and a length 214 of y (e.g., x pixels, inches, centimeters, etc.). Additionally, 3D translator device may determine that the 2D image 210 includes one or more colors, including black, white, grayscale, and color.

In various embodiments, the 3D translator device 102 may actuate an area 220 of its 3D touchpanel 106 that corresponds to the area of the 2D image 210 detected on the 2D touchscreen device 202. For example, the 3D translator device 102 may determine the length y and width x of the 2D image 210 and actuate an area 220 on the 3D touchpanel 106 with a corresponding length 224 (i.e., y') and width 222 (i.e., x'). In an embodiment, the dimensions and/or shapes of the area 220 may be a one-to-one dimensional representation from the 2D image 210. In other words, the size and shape of the 2D image 210 may be the size and shape of the actuated area 220 on the 3D touchpanel (i.e., x=x' and y=y'). In another embodiment, the actuated area 220 may be a scaled representation of the 2D image (e.g., x=2x' or y=0.5y'). Thus, because of differing touchscreen sizes or other technical, strategic, or aesthetic reasons, the size of the actuated area may be larger or smaller while still capturing the overall shape or other characteristics of the 2D image 210.

In the various embodiments, the 3D translator device 102 may also determine the extent to which the actuate area is actuated. In other words, the 3D translator device 102 may determine the degree to which the area 220 must be actuated to represent the 2D image 210 displayed on the 2D touchscreen device 202. As illustrated in FIG. 2, the degree of actuation may correspond to a particular height 226 (i.e., z) to raise the actuated area 220.

Thus, in an embodiment, the 3D translator device 102 may actuate the area 220 to form a 3D shape 230 that represents the 2D image 210. For example, as illustrated in FIG. 2, the 3D translator device 102 may detect an x 212 by y 214 square 2D image 210 and may define an x' 222 by y' 224 square actuated area 220 on the 3D touchpanel 106. The 3D translator may then raise the square actuated area 220 to form an x' 222 by y' 224 by z 226 cubic 3D shape 230 that represents the square 2D image 210.

Figure 3:
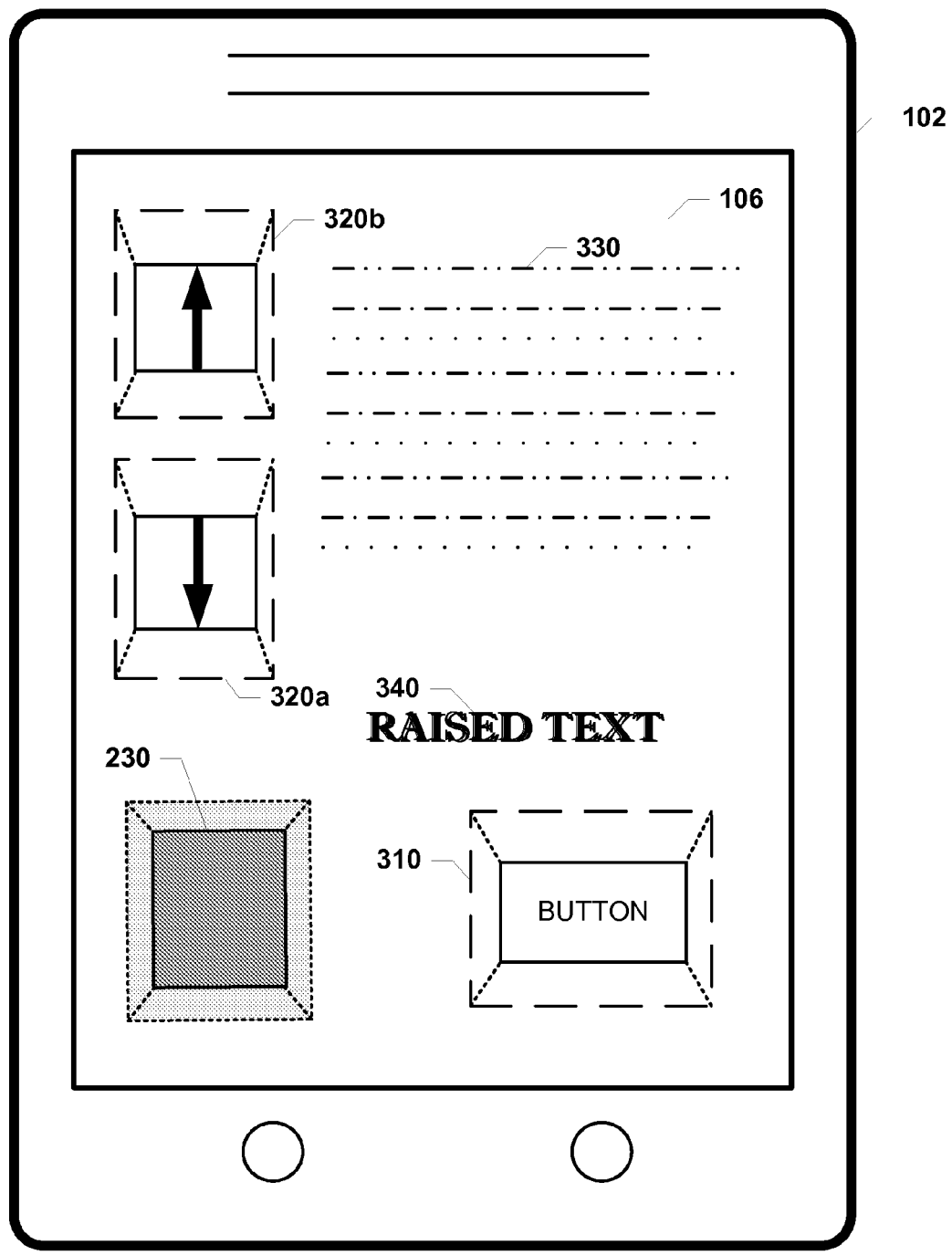
FIG. 3 is an illustration of an example 3D translator device according to an embodiment.

FIG. 3 illustrates an embodiment 3D translator device 102 that has actuated its 3D touchpanel 106 as described above in relation to FIG. 2 to form various 3D shapes, such as those displayed on a 2D device. While the 3D translator device 102 is illustrated as a standalone device, in other embodiments, the 3D translator device 102 may function as an overlay device that can be placed on various two-dimensional surfaces.

In some embodiments, the 3D translator device 102 may actuate its 3D touchpanel 106 to form 3D shapes that represent 2D images of a webpage displayed on a 2D touchscreen device 202 (not shown). The 2D images may be various browser objects typically included on a webpage, such as buttons, scroll bars, graphics, animations, text, etc.

In one embodiment, the 3D translator device 102 may form a 3D button shape 310 to represent a button currently displayed on the 2D touchscreen device. The 3D button shape 310 may be a scaled or one-to-one representation of the 2D button image. In another embodiment, the 3D button shape 310 may be a standardized three-dimensional shape that represents any webpage button detected. For example, the 3D translator device 102 may determine that a 2D image is a button on a webpage and deform the surface on the 3D touchpanel 106 into a uniform 3D button shape 310 regardless of the characteristics of the particular button.

Similarly, the 3D translator device may detect a 2D scroll bar image and form one or more 3D scroll bar shapes 320a, 320b to represent the 2D scroll bar image. For example, the 3D translator device 102 may form a 3D scroll bar shape 320b associated with scrolling up and another 3D scroll bar shape 320a associated with scrolling down. In another example, the 3D translator device 102 may form a 3D scroll bar shape (not shown) that can be physically moved up and down or side-to-side, similar to a traditional scroll bar.

The 3D translator device 102 may also represent 2D text in a number of ways. For example, the 3D translator device may represent 2D text as a 3D Braille shape 330 by determining the words in the 2D text, translating those words into Braille, and actuating the 3D touchpanel 106 to create a 3D Braille shape 330 based on the Braille translation. In another example, the 3D translator device 102 may represent 2D text by actuating the 3D touchpanel 106 to form 3D raised text shape 340.

In some embodiments, the 3D translator device 102 may function as a web browser itself by receiving 3D touch inputs on various 3D shapes formed on the 3D touchpanel 106. A user may press a 3D shape representing an actionable browser object (i.e., a 3D button shape 310, a 3D scroll bar shape 320a, 320b, etc.), and the 3D touchpanel 106 may be configured to detect and act on a user input received on a particular 3D shape. For example, on a 3D translator device 102 as illustrated in FIG. 3, the user may scroll through 3D text (e.g., 3D Braille shape 130) by pressing 3D scroll bar shapes 120a or 120b. The user may also press a 3D button shape 310 representing a button to submit a form, initiate a transaction, or various other web-based actions. Thus, by receiving users' input on the 3D touchpanel 106, the 3D translator device 102 may serve directly or indirectly as a web browser.

Figure 4:
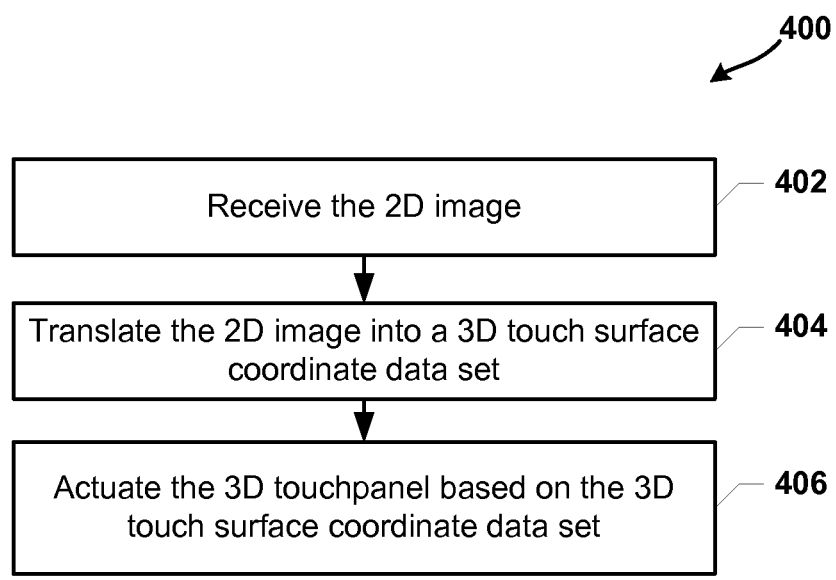
FIG. 4 is a process flow diagram illustrating an embodiment 3D translator device method for translating a 2D image into a 3D shape.

FIG. 4 illustrates an embodiment 3D translator device method 400 for translating 2D images into 3D shapes on a 3D touchpanel. In various embodiments, translating a 2D image into a 3D shape on the 3D touchpanel may generally include actuating a 3D touchpanel (e.g., raising and lowering piezoelectric pins positioned in a matrix under the 3D touchpanel) to form a shape that represents the 2D image.

In block 402, the 3D translator device may receive a 2D image. In various embodiments, the 3D translator device may include one or more photographic sensors configured to receive 2D image data in the form of photographic data. Using photographic sensors to receive 2D image data is discussed further in relation to FIGS. 15 and 16A-16C.

In some embodiments, the 3D translator device may receive 2D image data in the form of webpage or 3D meta-element data. In an embodiment, the 3D translator device may receive a 2D image only in the form of webpage or 3D meta-element data. In another embodiment, the 3D translator device may receive a 2D image as webpage data or as photographic data. For example, the 3D translator device may take a picture of a browser currently rendered on a 2D touchscreen device's display. The display may include some 3D meta-element data (e.g., a standardized picture for a button recognizable to the 3D translator device or a link to 3D rendering instructions) included with non-3D images (e.g., pictures or backgrounds). Receiving 2D image data as webpage or 3D meta-element data is discussed below in relation to FIGS. 17-18.

In block 404, the 3D translator device may translate the 2D image into a 3D touch surface coordinate data set. In an embodiment, the 3D translator device may determine the image characteristics of the 2D image data. In various embodiments, the image characteristics of the 2D image data may include, for example, the shape, size, color, texture, shading, and orientation of a 2D image. In an embodiment, the 2D image data may be received from photographic sensors operating on the 3D translator device. In another embodiment, the 3D translator device may receive the 2D image electronically as webpage data.

In various embodiments, the 3D translator device may translate a 2D image into a 3D touch screen coordinate data set based on the 2D image's image characteristics. A 3D touch surface coordinate data set may include the x-, y-, and z-coordinate values for one or more tixels in the 3D touchpanel.

In an embodiment, a processor operating on the 3D translator device 102 may refer to the 3D touch surface coordinate data set when determining which tixels to actuate. For example, the 3D translator device may determine based on the 3D touch surface coordinate data set that tixels in certain locations within the tixel array (i.e., the x- and y-coordinate values) are to be actuated (e.g., be raised or lowered) to a certain degree (i.e., the z coordinate value).

In an embodiment, the 3D translator device may associate one or more tixels in the tixel array with one or more pixels in a 2D image. In other words, as described in relation to FIG. 2, the shape/size and relative position of the 3D shape may be based on the 2D image. Thus, in an embodiment, the 3D translator device may base the x- and y-coordinate values of the tixels on x- and y-coordinate values of one or more pixels of the 2D image. In a further embodiment, the 3D touch surface coordinate data set may not represent a one-to-one mapping from pixels to tixels (i.e., the corresponding 3D shape is a scaled version or standardized version of the 2D image as described above).

In various embodiments, the 3D translator device 102 may also determine the degree of actuation (i.e., the z-coordinate value) for one or more tixels associated with a 2D image. In an embodiment, the 3D translator device 102 may determine a range of heights for the tixels associated with a 2D image according to various criteria. For example, the 3D translator device 102 may use color histograms to produce topographical renderings of the 2D image. In another example, the 3D translator device 102 may perform edge detection to distinguish groups of pixels in the 2D image that have a higher z-coordinate value (i.e., edges) with other groups of pixels that have a lower z-coordinate value (i.e., non-edges). Determining the z-coordinate values for one or more tixels is further discussed below in relation to FIGS. 16A-16C.

Returning to FIG. 4, in block 406, the 3D translator device may actuate the 3D touchpanel based on the 3D touch surface coordinate data set. In the various embodiments, the 3D translator device may energize the 3D touchpanel's actuators to implement each tixel's 3D touch surface coordinate data, thereby morphing the 3D touchpanel into a 3D shape that represents the 2D image. For example, the 3D translator device may uniformly actuate a group of tixels that form a square to raise the 3D touchpanel into a cube.

FIGS. 5A-5D illustrate a portion of an embodiment 3D touchpanel 106 that uses actuator mechanisms and is coupled to a deformable surface. Actuators which rely on piezoelectric elements may cause portions of a deformable surface 504 to become raised when activated. The deformable surface 504 may be raised by a plurality of pins 506 individually driven by linear actuator motors 512. In this embodiment, the deformable surface 504 may be a pliable surface layer which can be displaced vertically by an underlying pin 506 which is held in place laterally by parallel plates 508 and 510 and driven vertically by an actuator motor 512. The actuator motor 512 may be any suitable linear actuator, including linear piezoelectric actuators, solenoid actuators, linear motors, linear stepper motors, etc. Each actuator motor 512 may be driven by an individual electric signal, such as is delivered by a connector 514 which may be coupled to a processor within the 3D translator device. In an example of an embodiment in which piezoelectric pins are used to deform the deformable surface, the 3D translator device may cause the pins to extend approximately five millimeters.

FIG. 5A illustrates a cross-sectional diagram of an embodiment tactile element actuator 500 included in a 3D touchpanel 106. In an embodiment, the tactile element actuator 500 may be in the down or deenergized configuration. In this configuration, the deformable surface 504 lies flat.

FIG. 5B illustrates a cross-sectional diagram of an embodiment tactile element actuator 500 included in a 3D touchpanel 106. In an embodiment, a portion of the tactile element actuator 525 may be in the up or energized configuration. In a further embodiment, the deformable surface 504 may be raised by pressure applied by a pin 506.

As illustrated in FIGS. 5C and 5D, a plurality of the tactile element actuators may be closely spaced and configured as an array of tactile elements. Such a configuration may enable actuation of different portions of the deformable surface 504 in response to individual signals applied by the processor via connectors 514 that create 3D representations (i.e., 3D shapes) of different shapes and sizes based on 2D images.

FIG. 5C illustrates a portion of a 3D touchpanel 550 without any tactile units activated, and accordingly none of the tactile element actuators are energized. FIG. 5D illustrates the 3D translator device in a mode in which information is represented on the surface by multiple raised tactile units, with a 3D shape 520 formed by energized actuators. By organizing or configuring the tactile element actuators to be individually energized and arranging them in an array, a wide variety of different 3D shapes can be generated.

In various embodiments, raised tactile units may be activated using piezoelectric mechanisms. Piezoelectric materials change shape (e.g., elongate) in the presence of an applied electric field. The piezoelectric elements may be coupled directly to the deformable surface 504 of the 3D touchpanel or may be coupled to mechanical pins which contact the surface response to individual activation signals, such as to generate raised tactile units, as shown in FIGS. 5A and 5B. Electric fields used to actuate piezoelectric elements may be individually connected to the elements by a processor, such as through an interface of solid state switches that connect the elements to a voltage source. Multiple independently actuating piezoelectric elements can be controlled by a processor to generate any of a variety of raised surface shapes.

An example of a piezoelectric element that may be used in various embodiments is Macro Fiber Composite (MFC), manufactured and sold by Smart Material Corp. of Sarasota, Fla. The MFC comprises rectangular piezo-ceramic rods sandwiched between layers of adhesive and electroded polyimide film. This film contains interdigitated electrodes that transfer applied voltages directly to and from the ribbon shaped rods. This assembly enables in-plane poling, actuation, and sensing in a sealed, durable, ready-to-use package. When embedded in a surface or attached to flexible structures, the MFC can provide distributed solid-state deflection and vibration control or strain measurements.

Figure 6A:
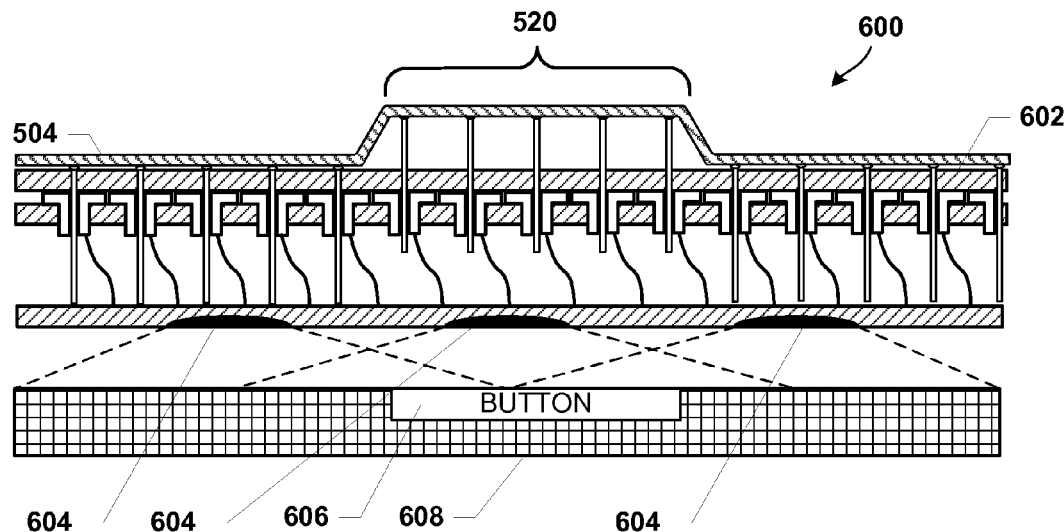
FIG. 6A is a cross-sectional view of an embodiment 3D translator device configured to capture 2D images from a 2D touchscreen device using an array of cameras.
Figure 6B:
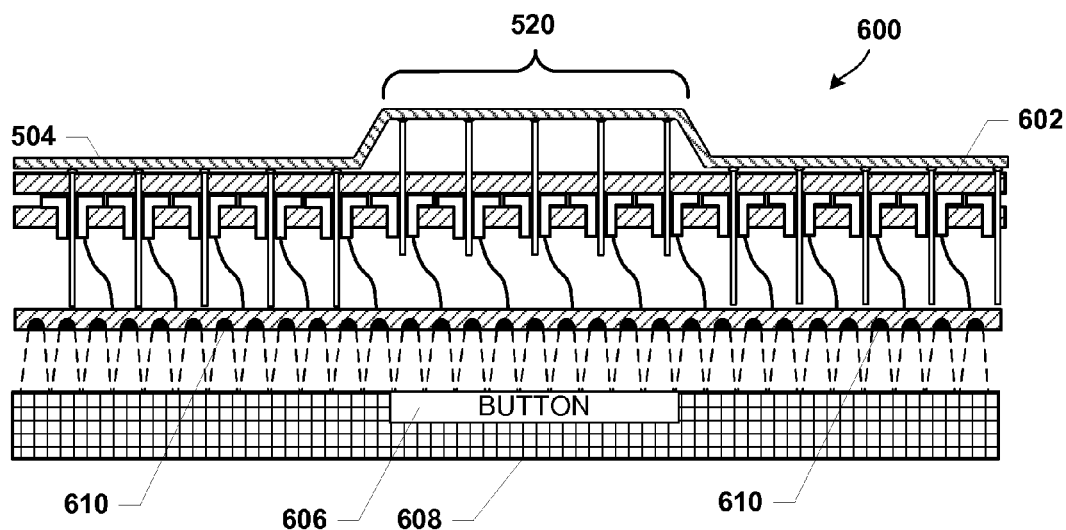
FIG. 6B is a cross-sectional view of an embodiment 3D translator device including an array of light sensors linked to an array of 3D actuators.

FIG. 6A-B illustrate cross-sectional diagrams of embodiment 3D translator devices in close proximity to a surface that includes one or more 2D images. In various embodiments, the 3D translator device 600 may include various photographic sensors, such as various cameras 604, pixel/light sensors 610, or stereographic cameras (not shown). In a further embodiment, the photographic sensors 604, 610 may be positioned on the bottom of the 3D translator device 600 and the deformable surface 504 may be positioned on the other side (i.e., the top) of the 3D translator device 600. In an embodiment, the 3D translator device 600 may be placed on top of a 2D image such that the photographic sensors 604, 610 are close enough to capture a 2D image In another embodiment, a digital display 608 may display a webpage through a browser. In this embodiment, the digital display 608 may display various actionable browser objects 606, such as various buttons, scroll bars, and links. The 3D translator device 600 may utilize its photographic sensors 604, 610 to image the actionable browser object 606 displayed on the digital display 608 and actuate a portion of 3D touchpanel based on the imaged actionable browser object 606.

While not shown, the digital display 608 may also display various animations, pictures, images, and text (not shown) and that the 3D translator device 600 would be capable of utilizing its photographic sensors 604, 610 to image those 2D images and create one or more 3D shapes based on those 2D images.

As illustrated in FIG. 6A, in an embodiment, the 3D translator device 600's cameras 604 may receive photographic information from a digital display 608, such as the display found on a 2D device. In an embodiment, the cameras 604 may be positioned to capture some or all of 2D images 606 displayed the digital display 608. In a further embodiment, the cameras 604 may overlap to ensure that an entire 2D image is captured, for instance, when the 2D image is very close to the 3D translator device and each camera 604 is incapable of individually capturing the entire 2D image.

As illustrated in FIG. 6B, in another embodiment, the photographic sensors may include light/pixel sensors 610 configured to detect the intensity and characteristics of light emitted from the pixels on a display panel 608. In this embodiment, the light/pixel sensors 610 may capture photographic information of the images displayed on the display panel 608 with a high degree of granularity. For instance, the pixel sensors 610 may be configured to distinguish between individual pixels or small groups of pixels. By distinguishing each pixel or each small group of pixels, the pixel sensors 610 may provide the 3D translator device 600 with detailed image of the 2D image 606 displayed on the display panel 608.

Figure 7:
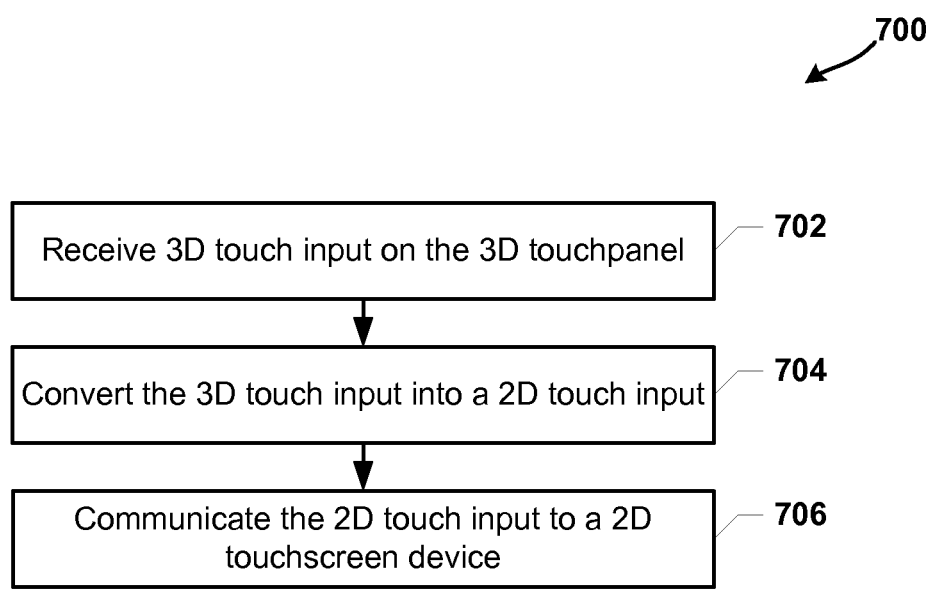
FIG. 7 is a process flow diagram illustrating an embodiment 3D translator device method for converting a 3D touch input into a 2D touch input.

FIG. 7 illustrates an embodiment 3D translator device method 700 for translating a 3D touch input into a 2D touch input.

In block 702, the 3D translator device 102 may receive a 3D touch input on its 3D touchpanel 106. In an embodiment, a user may initiate a 3D touch input by pressing a raised portion of the 3D touch panel 106's deformable surface associated with a button.

In block 704, the 3D translator device 102 may convert the 3D touch input into a 2D touch input. In various embodiments, the 3D translator device 102 may perform this step by determining the location on the 2D touchscreen device 202 that corresponds with the location on the 3D touchpanel 106 that detected the user's touch. In an embodiment, the 3D translator device 102 may be configured to detect the 3D touch input based on, for example, a change in capacitance or a change in pressure caused by the force exerted by the user's finger that the 3D touchpanel 106 measures. The 3D translator device 102 may also determine the location of the 3D touch input based on the measured change.

In another embodiment, the 3D translator device 102 may determine the location or element displayed on the 2D touchscreen display that corresponds with the location in which the 3D touch input was received. For example, if a user touches a 3D shape that represents a button displayed on the 2D touchscreen device 202, the 3D translator device 102 may determine that the 2D touch input should be directed to that button displayed on the 2D touchscreen device 202.

In block 706, the 3D translator device may communicate the 2D touch input to the 2D touchscreen device. In the various embodiments, the 3D translator device may transmit the 2D touch input to a 2D touchscreen device with which the 3D translator device is in communication.

In an embodiment, the 3D translator device 102 may physically simulate a 2D touch input on the 2D touchscreen device as described below in relation to FIG. 8. For example, the 3D translator device 102 may include a plurality of mechanical fingers that extend to physically touch the 2D touchscreen device. In this example, the 3D translator device may simulate a 2D touch input by actuating one or more mechanical fingers to change the electrical properties at the touch location of the 2D touchscreen device 202, for example. In another example (not shown), the 3D translator device 102 may change the electrical properties of part of the 3D translator device 102, which may thereby change the electrical properties on the 2D touchscreen device 202 at the location nearest the 3D translator device.

In another embodiment in which the 3D translator device 102 is connected to the 2D touchscreen device over a wired or wireless data link (e.g., a Bluetooth connection), the 3D translator device 102 may communicate the 2D touch input by signaling the 2D touchscreen device 202 that a touch was received at a particular location on the 2D touchscreen device.

Figure 8:
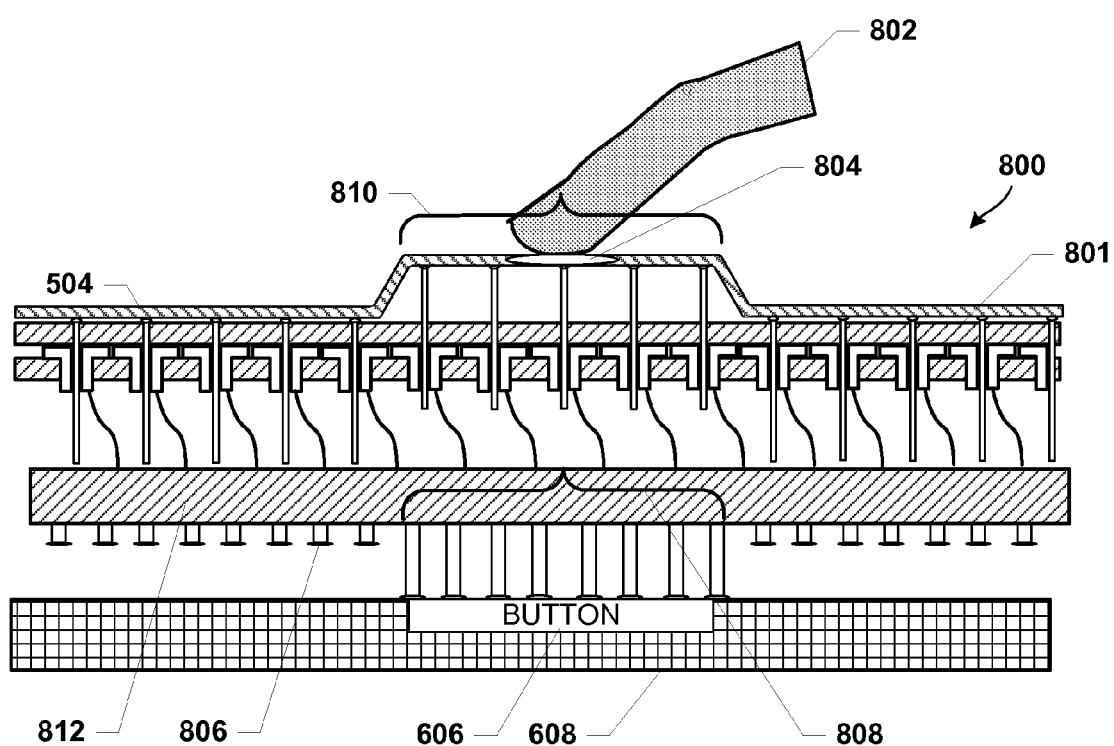
FIG. 8 is a cross-sectional view of an embodiment 3D translator device configured to translate a 3D touch input into a mechanical 2D touch input.

FIG. 8 illustrates a cross-sectional diagram of an embodiment system that includes a 3D translator device 801 configured to translate a 3D touch input into a 2D touch input for use by a 2D touchscreen device. In various embodiments, as discussed above in relation to FIG. 7, a 3D translator device 801 may actuate various portions of a 3D touchpanel in order to deform the deformable surface 504 into various 3D shapes 810 based on 2D images, such as an actionable browser object 606.

In an embodiment, the 3D translator device 801 may include an array 812 of mechanical fingers 806 (i.e., styluses) that are positioned on the bottom of the 3D translator device 801 such that the mechanical fingers 806 are in close proximity to the display 608 of a 2D touchscreen device. In another embodiment, the mechanical fingers 806 may be configured to extend from the 3D translator device 801 towards the display of a 2D touchscreen device 608. In this embodiment, a processor operating on the 3D translator device 801 may send signals to one or more actuator mechanisms (not shown) associated with the one or more of the mechanical fingers 806, causing the one or more actuator mechanisms to extend or retract the mechanical fingers 806 toward or away from the 2D touchscreen device's display 608, respectively. In other words, the actuator mechanisms may cause the one or more mechanical fingers 806 to come into contact with the 2D touchscreen device.

In a further embodiment, the mechanical fingers 806 may have electrical proprieties, such as the ability to mimic a finger press from a user 802. For example, in a 2D touchscreen device configured to receive touch inputs using a projected capacitance touchscreen technology, the mechanical fingers 806 may change the capacitance in the location in which the mechanical fingers 806 come into contact with the 2D touchscreen device such that the 2D touchscreen device records the contact from the mechanical fingers 806 as a touch input.

In an embodiment, the 3D translator device 801 may be configured to detect a 3D touch input 804 from a user 802. For example, the 3D translator device 801 may determine that a user 802 has pressed a portion of the deformable surface. In a further embodiment, the 3D translator device 801 may detect the 3D touch input 804 using various techniques, including sensing an increase in the weight or pressure affecting a particular location on the 3D touchpanel or sensing a change in the electrical properties of a particular location caused by the user's coming into contact with the 3D touchpanel. For example, the 3D translator device may detect the increase in weight associated with the user 802's pushing her finger against the 3D touchpanel and determine that a 3D touch input was received at that location based on the increase in weight.

In another embodiment, the 3D touch input 804 may be received on an actuated portion of the 3D touch panel. For example, the 3D touch input 804 may be received on an actionable 3D shape 810 that represents an actionable browser object 606 currently displayed on a 2D touchscreen device 506's display. In this embodiment, the 3D translator device may cause one or more mechanical fingers 806 to extend and come in contact with the 2D touchscreen device's display 608. For example, the 3D translator device 801's processor may determine the location of the 3D touch input 804 and send signals to actuator mechanisms that are similarly located on the 3D translator device 801 (e.g., in the same location on the opposite side of the 3D translator device 801) to cause the actuator mechanisms to extend one or more mechanical fingers 806. In a further embodiment, the location of the extended mechanical fingers 808 may correspond to the location of the 3D shape 810 that receives the 3D touch input 804. In this way, for example, the 3D translator device 801 may create an actionable 3D shape 810 based on an actionable browser object 606 (e.g., a button), receive a 3D touch input on the 3D shape 810, extend one or more mechanical fingers toward the browser displayed on the 2D touchscreen device, and mimic a 2D input by pressing the 2D touchscreen device in the location in which the active browser object 606 is displayed. In this way, the 3D translator device may translate a 2D image into a 3D shape, receive a 3D touch input on the 3D shape, and translate the 3D touch input into a 2D touch input by causing the mechanical fingers 806 to touch the 2D image's location.

While translating a 3D touch input into a 2D touch input has been described above in relation to mechanical fingers 806, in another embodiment, the 3D translator device 801 may other mechanisms that may mimic a 2D touch input. In an embodiment, the 3D translator device 801 may utilize an "e-stim" mechanism. In this embodiment, the 3D translator device 801 may selectively change the electrical properties of one or more locations on the bottom 812 of the 3D translator device 801, which is in close proximity to a 2D touchscreen device's display 608. By changing the electrical properties of one or more locations on the bottom 812 of the 3D translator device 801, the 3D translator device 801 may affect the electrical properties of select areas of the 2D touchscreen device's display 608, thereby mimicking a 2D touch input from a user.

In another embodiment, the 3D translator device 801 may actuate an actionable 3D shape 810 in response to receiving a 3D touch input on the actionable 3D shape 810. For example, the 3D translator device 801 may lower the actionable shape 810 in response to receiving a touch from a user when the actionable 3D shape 810 is representing a button displayed on the 2D touchscreen device's display 608. In other words, the 3D translator device 801 may simulate a button "click" by depressing the actionable 3D shape 810. In another example, the 3D translator device 801 may "slide" the actionable 3D shape 810 in response to detecting a user sliding his finger along the actionable 3D shape 810 when the 3D shape 810 is representing a scroll bar, thereby simulating the movement of the 2D scroll bar on the deformable surface 504.

Figure 9:
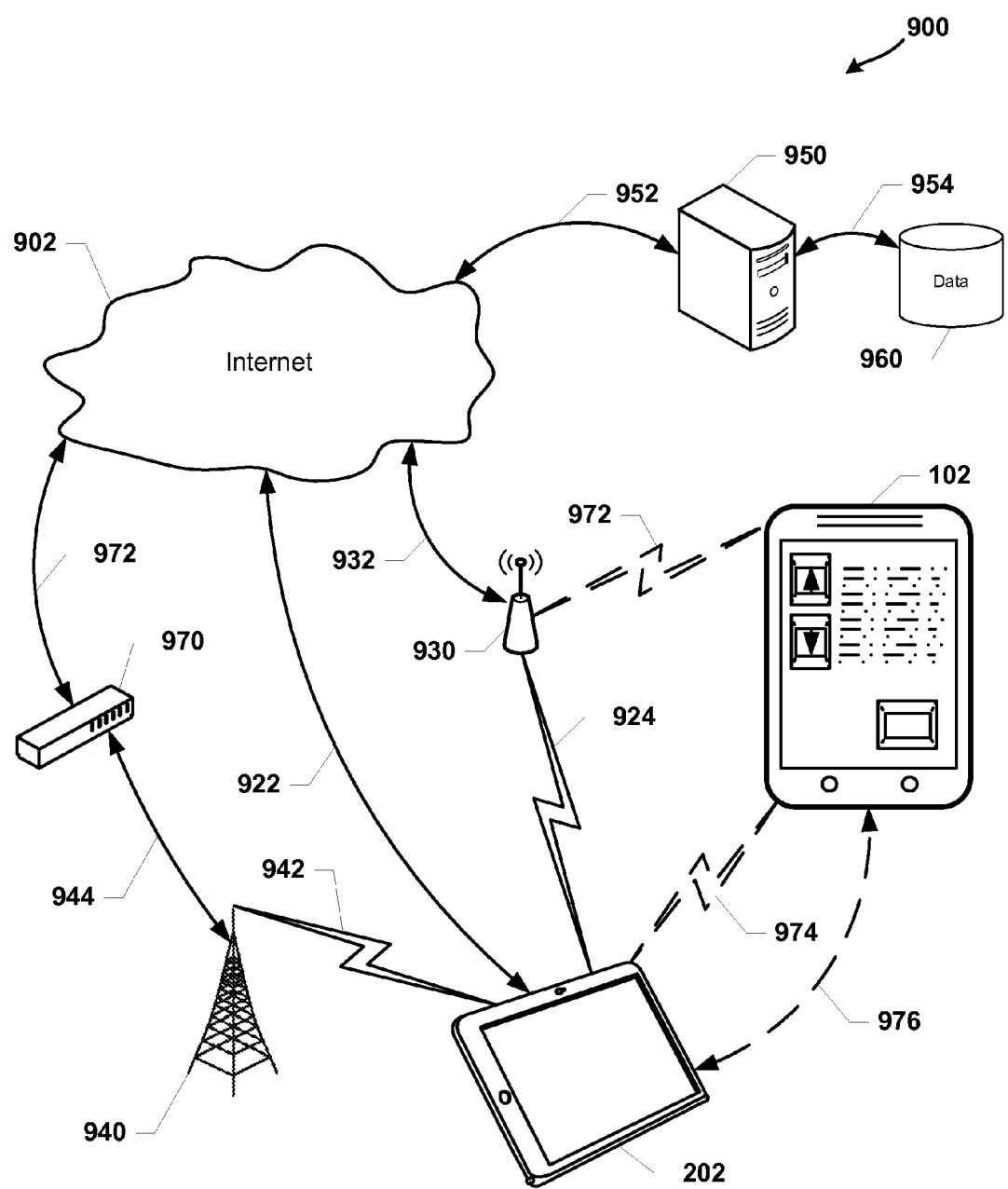
FIG. 9 is a communication system block diagram of a network suitable for use with the various embodiments.

FIG. 9 illustrates a network system 900 suitable for use with the various embodiments. The network system 900 may include a 3D translator device 102 and a 2D touchscreen device 202. The 3D translator device 102 may optionally connect to the 2D touchscreen device 202 over an optional wired connection 976 or through an optional wireless connection 974. For example, the optional wireless connection may be through a near-field communication (e.g., Bluetooth®). Additionally, the 3D translator device may optionally connect to the Internet 902 through an optional wireless connection 972 with a wireless access point 930, which may have a wired connection 932 to the Internet 902.

The 2D touchscreen device 202 may be configured to connect to the Internet 902 via a wired connection 922. In addition, the 2D touchscreen device 202 may be configured to connect to the Internet 902 via a wireless connection 924 established through a wireless access point 930, such as a WiFi access point. The wireless access point 930 may connect with the Internet 902 through a wired connection 932. Additionally, 2D touchscreen device 202 and a cellular tower or base station 940 may exchange data via a cellular connection 942, which may be CDMA, TDMA, GSM, PCS, 3G, 4G, LTE, or any other type of cellular connection. It should be noted that, while not shown in FIG. 9, the 3D translator device 102 may be equipped with a cellular communication interface and configured to connect to the Internet 902 via a cellular connection, which may be CDMA, TDMA, GSM, PCS, 3G, 4G, LTE, or any other type of cellular connection. The cellular tower or base station 940 may be in communication via a wired connection 944 with a router 970 which may connect to the Internet 902 through a wired connection 972. A web server 950 that manages and transmits various web data may also connect to the Internet 902 over a wired connection 952. The web server 950 may additionally connect to a database 960 via a wired connection 954.

Figure 10:
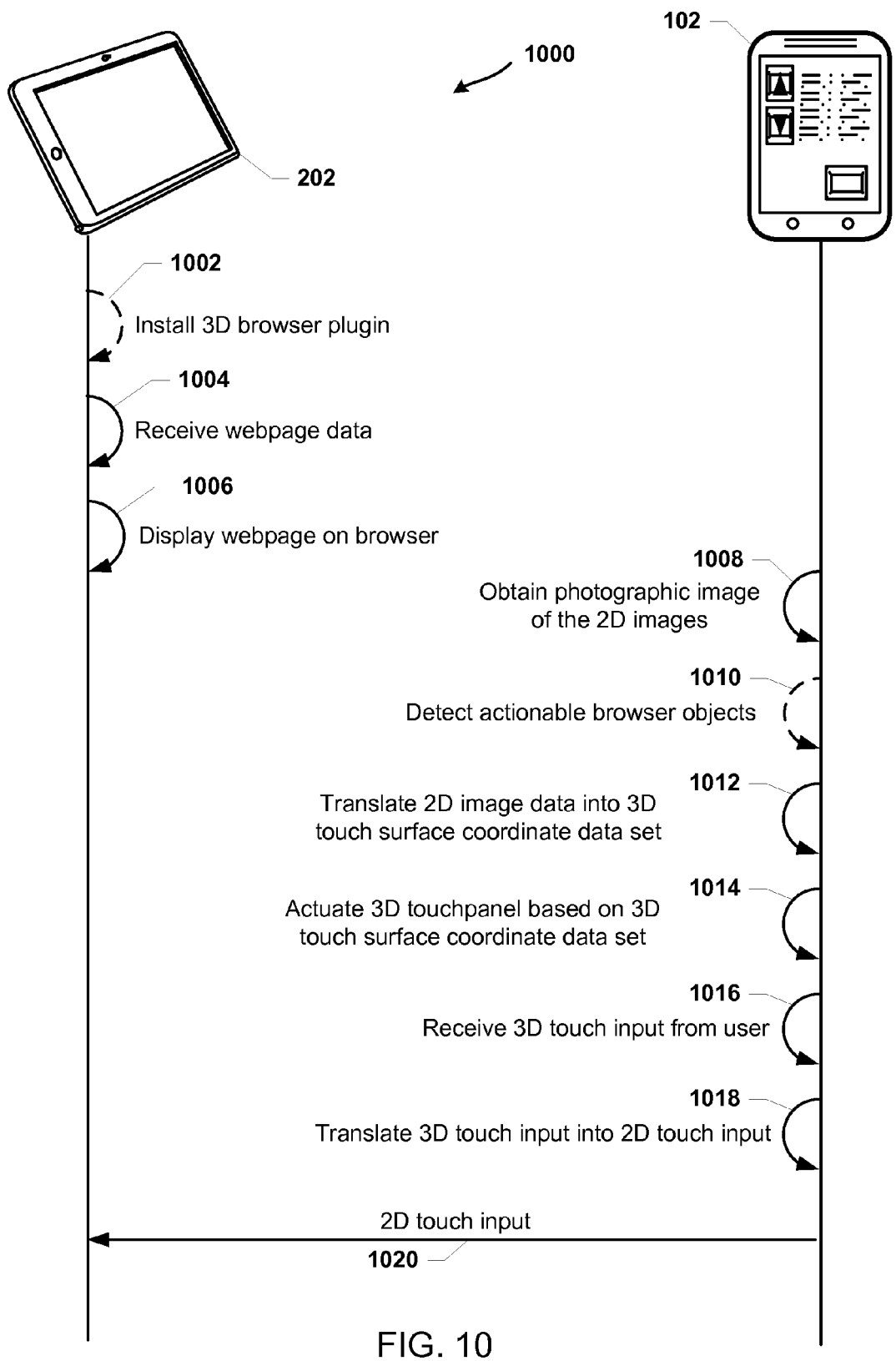
FIG. 10 is a call flow diagram illustrating interactions between a 2D touchscreen device and a 3D translator device.

FIG. 10 illustrates a signaling and call flow 1000 between a 2D touchscreen device 202 and a 3D translator device 102. In various embodiments, a 3D translator device 102 may function in conjunction with a 2D touchscreen device 202. In an embodiment, the 3D translator device 102 may be positioned with respect to the 2D touchscreen device 202 such that the 3D translator device 102's photographic sensors are able to capture photographic information from the 2D touchscreen device 202's display panel.

In optional operation 1002, the 2D touchscreen device 202 may optionally install a 3D browser plug-in. In an embodiment, the 3D browser plug-in may configure the 2D touchscreen device 202 or a browser operating on the 2D touchscreen device 202 to receive, interpret, display, or otherwise output one or more of 3D meta-elements and 3D cascading style sheets ("3D CSS"). In a further embodiment, after installing the 3D browser plug-in, the 2D touchscreen device 202 may be able to implement 3D meta-elements in the form of HTML tags, similar to 2D alt-tags. For example, the 3D-enabled browser may be enabled to detect a particular 3D meta-element associated with a scroll bar that causes the browser to render a standardized 2D image on the display panel that the 3D translator device 102 will understand to be a scroll bar instead of a static graphic. In another example, the 3D meta-element may cause the browser to render a link undetectable to the human eye that the 3D translator device 102 may follow to receive instructions on how to represent a particular object associated with the 3D meta-element (e.g., a picture or an animation) in 3D.

In operation 1004, the 2D touchscreen device 202 may receive webpage data. In various embodiments, the 2D touchscreen device 202 may access the Internet or another network with a browser, the browser may request webpage data from one or more web sites on the Internet, and the web site may transmit webpage data to the browser in response. In an embodiment, the website may send webpage data that does not include any 3D meta-elements or 3D CSS data. In another embodiment, one or more websites may have implemented one or more of 3D meta-elements and 3D CSS in an effort to facilitate creating 3D shapes on a 3D translator device 102. For example, websites may implement 3D meta-elements, in part, in an effort to allow visually impaired individuals to interact with the webpages hosted on those websites. The 2D touchscreen device 202 may then display the webpage on the browser in operation 1006.

In operation 1008, the 3D translator device 102 may obtain photographic image data of the 2D images displayed on the 2D touchscreen's display screen. In an embodiment, the 3D translator device 102 may use cameras positioned near the 2D touchscreen device 202's display panel to take pictures of the display panel. In another embodiment, the 3D translator device 102 may use one or more of various pixel sensors and light sensors configured to distinguish between pixels on the 2D touchscreen device 202's display panel.

In optional operation 1010, the 3D translator device 102 may optionally detect actionable browser objects. In an embodiment, the 3D translator device 102 may be configured to determine whether a particular 2D image represents an actionable browser object (e.g., a button, scroll bar, link, or other object used to navigate). In a further embodiment, an actionable browser object may include objects that have 3D meta-element characteristics, such as a standardized picture or link that the 3D translator device 102 recognizes as 3D enabled. For example, the 3D translator device 102 may determine that a certain symbol rendered on the display panel represents a particular three-dimensional form that the 3D translator device 102 knows how to create.

In operation 1012, the 3D translator device 102 may translate the 2D image data into a 3D touch surface coordinate data set. In various embodiments, the 3D translator device 102 may convert the pixels representing the 2D image into 3D coordinates for one or more tixels, which are then represented in the 3D touch surface coordinate data set. For example, the 3D translator device 102 may convert a pixel's color value into the corresponding tixel's z coordinate value (i.e., the degree of actuation) in the 3D touch surface coordinate data set.

In operation 1014, the 3D translator device 102 may actuate the 3D touchpanel based on the 3D touch surface coordinate data set. In an embodiment, the 3D touchpanel may include a two-dimensional array of tixels, and each tixel may be actuated to a particular degree or magnitude (e.g., height). For example, the tixels may be actuated to transform the face of the 3D touchpanel based on their z coordinate values. In a further example, the 3D touchpanel may actuate piezoelectric pins to various heights. In this example, the 3D touchpanel may actuate the tixels to create a cylinder area on the deformable surface to correspond to a 2D circle.

In operation 1016, the 3D translator device 102 may receive a 3D touch input from a user. As discussed above, a 3D touch input may be touch activity (e.g., a finger press or gesture) detected on the 3D touchpanel. In an embodiment, the 3D translator device 102 may receive a 3D touch input from a user while the user is using the 3D translator device 102 to navigate the Internet. For example, the user may press a raised "back button" or a scroll button on the 3D touchpanel.

The 3D translator device 102 may translate the 3D touch input into a 2D touch input in operation 1018. In an embodiment, the 3D translator device 102 may determine the location on the 3D touchpanel in which the 3D touch input was received and determine the corresponding location on the 2D touchscreen device 202. The 3D translator device 102 may then send the converted 2D touch input 1020 to the 2D touchscreen device 202. In an embodiment, the 3D translator device 102 may transmit the converted 2D touch input by physically touching the 2D touchscreen device 202 with one or more mechanical fingers. In another embodiment, the 3D translator device 102 may transmit the 2D touch input over a wired or wireless data link. In yet another embodiment, the 3D translator device 102 may change the electrical properties of the bottom of the 3D translator device 102 nearest the 2D touchscreen device 202 in order to simulate a touch input on the 2D touch screen device.

Figure 11:
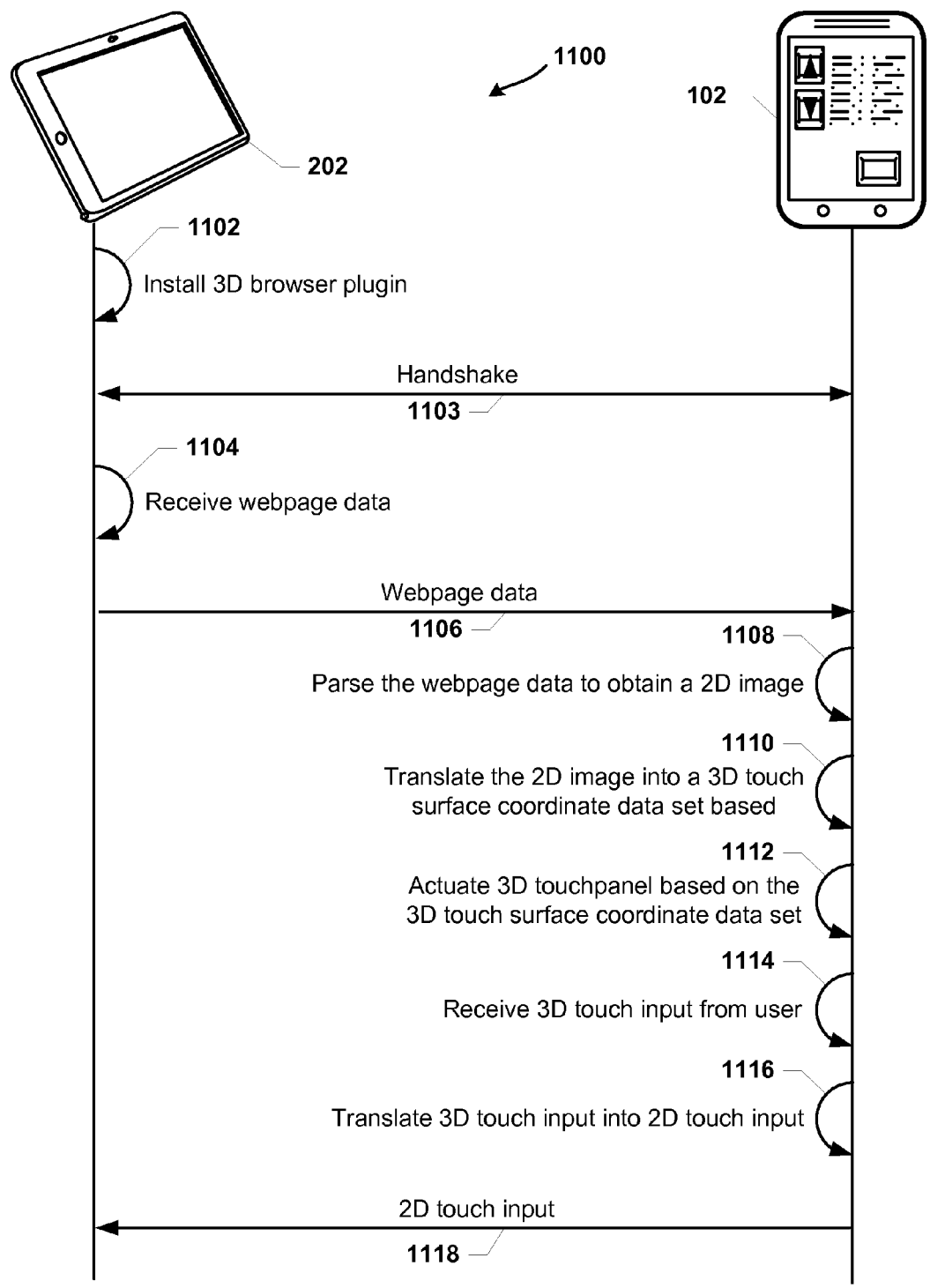
FIG. 11 is a flow diagram illustrating interactions between a 2D touchscreen device and an embodiment 3D translator device in which the 3D translator device is configured to receive image data directly from the 2D touchscreen device.

FIG. 11 illustrates another embodiment calling and signal flow 1100 between a 2D touchscreen device 202 and a 3D translator device 102 in which the 3D translator device 102 receives a 2D image over a data connection with the 2D touchscreen device 202 instead of with photographic sensors.

In operation 1102, the 2D touchscreen device 202 may install a 3D browser plug-in as described in relation to optional operation 1002 in FIG. 10. In an embodiment, the 3D browser plug-in may enable the 2D touchscreen device 202 to receive webpage data that includes 3D meta-elements or 3D CSS data and implement those features. The 2D touchscreen device 202 and the 3D translator device 102 may exchange handshake signals 1103 in order to establish a data connection. In an embodiment, the data connection may be a wireless connection over, for example a WiFi or Bluetooth connection, or may be over a wired connection.

At some point, the 2D touchscreen device 202 may receive webpage data in operation 1104. In an embodiment, receiving webpage data may include accessing a webpage with a browser. The webpage data may include elements, including style elements, actionable browser objects (e.g., buttons, scroll bars, and links), as well as various graphics and text. The webpage data may also include various meta-data and mark-up language information (e.g., meta-tags, etc.) needed by the browser to render the webpage on the 2D touchscreen device 202's display panel. The 2D touchscreen device 202 may send to the 3D translator device 102 a webpage data signal 1106 that includes the various types of data included in the received webpage data.

In operation 1108, the 3D translator device 102 may parse the webpage data. In an embodiment, the 3D translator device 102 may parse the webpage data to obtain a 2D image (e.g., a button, graphic, text, etc.) included in the webpage data. For example, the 3D translator device 102 may detect that a button or graphic is included in the webpage data.

In operation 1110, the 3D translator device 102 may translate the 2D image into a 3D touch surface coordinate data set. In an embodiment, the 3D translator device 102 may determine the x, y, and z coordinate values for one or more tixels based on 3D meta-data and 3D CSS style elements included with the webpage data that describe the 2D image. For example, the webpage data may include meta-data or 3D CSS information that provides the precise x, y, and z coordinate values needed to create the 3D touch surface coordinate data set.

In operation 1112, the 3D translator device 102 may actuate the 3D touchpanel based on the 3D touch surface coordinate data set. In an embodiment, the 3D touchpanel may include a two-dimensional array of tixels, and each tixel may be actuated to a particular height. In this example, the 3D touchpanel may actuate the tixels to create a cylinder-shaped 3D shape on the deformable surface to represent to a circle.

In operation 1114, the 3D translator device 102 may receive a 3D touch input from a user. As discussed above, a 3D touch input may be touch activity (e.g., a finger press or gesture) detected on the 3D touchpanel.

The 3D translator device 102 may translate the 3D touch input into a 2D touch input in operation 1116. In an embodiment in which the 3D translator device 102 is placed on top of the 2D touchscreen device 202, the 3D translator device 102 may determine the location on the 3D touchpanel in which the 3D touch input was received and determine the corresponding location on the 2D touchscreen device 202. The 3D translator device 102 may then send the converted 2D touch input 1020 to the 2D touchscreen device 202. In an embodiment, the 3D translator device 102 may transmit the converted 2D touch input by physically touching the 2D touchscreen device 202 with one or more mechanical fingers. In another embodiment, the 3D translator device 102 may transmit the 2D touch input over a wired or wireless data link. In yet another embodiment, the 3D translator device 102 may change the electrical properties of the bottom of the 3D translator device 102 nearest the 2D touchscreen device 202 in order to simulate a touch input on the 2D touch screen device. In still another embodiment, the 3D translator device 102 may send the 2D touch input signal over the established data connection rather than translating the 3D touch input into a physical 2D touch input.

Figure 12:
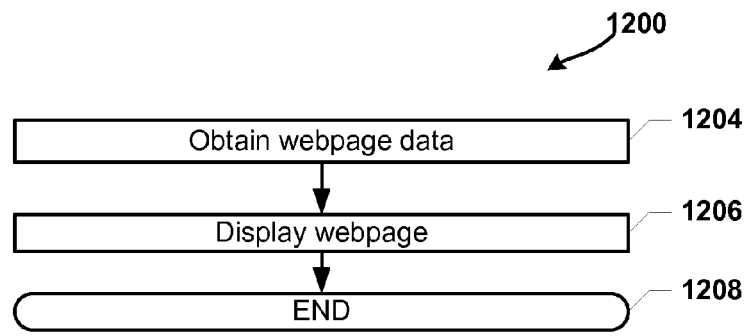
FIG. 12 is a process flow diagram illustrating a 2D touchscreen device method for displaying a webpage.

FIG. 12 illustrates an embodiment browser method 1200 for displaying a webpage on a browser according to known methods. In various embodiments, the browser may not be configured to recognize or support 3D meta-elements or 3D CSS. In other words, the browser may not be configured to communicate with a 3D translator device, either directly or indirectly.

In block 1204, the browser may obtain webpage data. In an embodiment, the browser may be in communication with a webpage over a network, such as the Internet. In another embodiment, the webpage data may include various components of a typical webpage, including text, formatting instructions, videos, animations, graphics, links, and other instructions to enable the browser to navigate the webpage. In addition to obtaining webpage data, the browser may also display the webpage based on the received webpage data in block 1206. In various embodiments, the browser may function similarly to a typical browser. The browser may end operating in block 1208.

Figure 13:
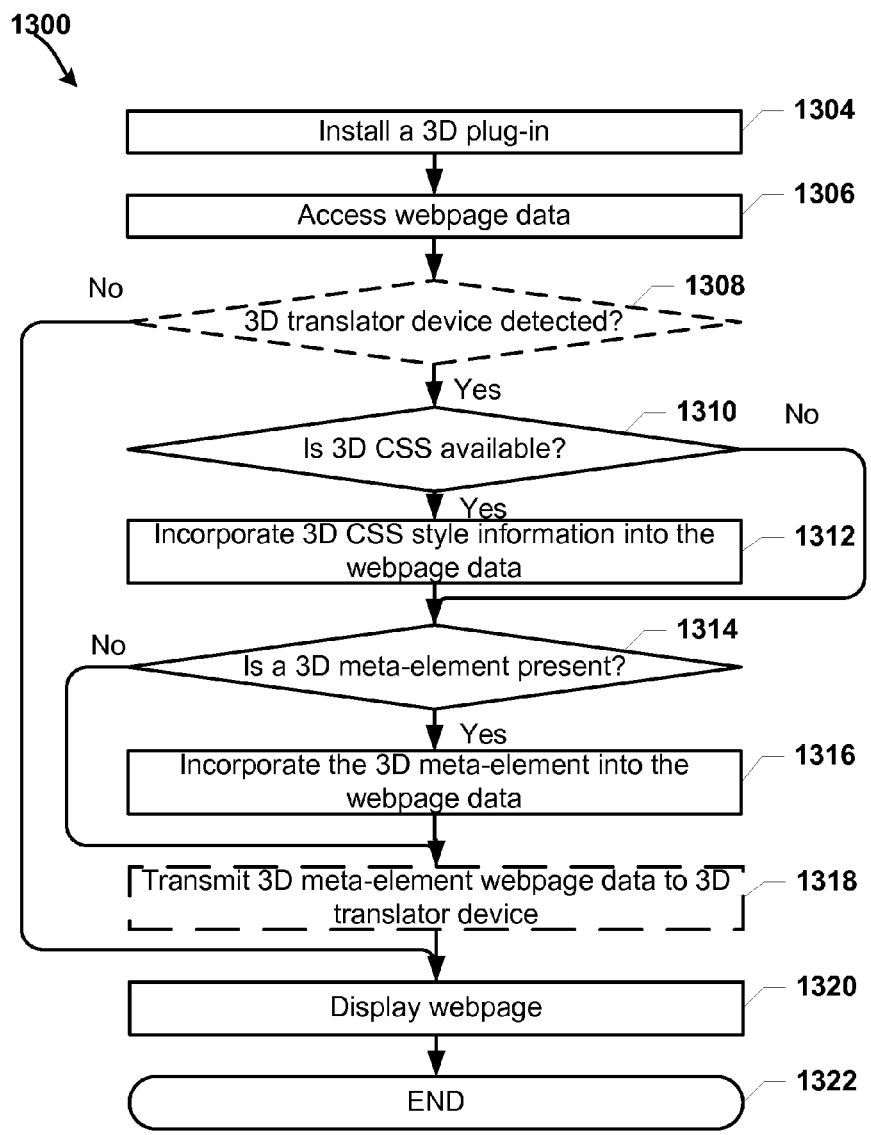
FIG. 13 is a process flow diagram illustrating an embodiment method for providing 3D meta-elements to a 3D translator device.

FIG. 13 illustrates an embodiment browser method 1300 for displaying a webpage on a browser that supports 3D and operates on a 2D touchscreen device. In various embodiments, a browser may be configured to recognize and display various types of 3D meta-elements and 3D style sheets that may enable the browser to communicate instructions or other data to a 3D translator device for use in representing a 2D image that the browser displays on the 2D touchscreen device.

In block 1304, the 3D-enabled browser may install a 3D plug-in. In various embodiments, the 3D plug-in may enable the browser to communicate directly or indirectly with a 3D translator device. For instance, installing the 3D plug-in may enable the browser to implement or access 3D features.

In block 1306, the 3D-enabled browser may access webpage data. In various embodiments, the webpage data may include various 3D features or functionalities, such as 3D meta-elements and 3D CSS data. For example, the webpage data may be from a webpage that supports a 3D representation of the webpage to assist visually-impaired individuals navigate that webpage. In a further example, the webpage may include 3D meta-element instructions for converting the text normally displayed on a 2D touchscreen device into Braille on a 3D translator device. In another example, the webpage may include 3D CSS instructions that may enable the 3D translator device to represent buttons, scroll bars, or other navigable features on the 3D touchpanel.

The 3D-enabled browser may optionally determine in optional determination block 1308 whether a 3D translator device is detected. In some embodiments, the 3D translator device may be connected directly to a 2D touchscreen device that is running the 3D-enabled browser. In these embodiments, the 3D-enabled browser may be able to detect the 3D translator device. In another embodiment, the 3D-enabled browser may utilize a camera or other sensor function to detect the presence of the 3D translator device. If the 3D-enabled browser does not detect the 3D translator (i.e., optional determination block 1308="No"), the 3D-enabled browser may display the webpage in block 1320. In an embodiment, the 3D-enabled browser may not display or implement 3D functionality when no 3D translator device is detected. This embodiment may facilitate the 3D-enabled browser's displaying the webpage in a 2D optimized format for typical viewing.

If the 3D-enabled browser does detect the 3D translator (i.e., optional determination block 1308="Yes"), the 3D-enabled device may determine in determination block 1310 whether 3D CSS is available. In an embodiment, the webpage data may include 3D CSS formatting instructions or data. As discussed above, the 3D CSS data may function similarly to typical CSS data but may, instead, provide particular formatting instructions to the browser to render certain 3D images or links on the display that the 3D translator device may detect with photographic sensors. For example, the 3D CSS may include formatting instructions that cause the 3D-enabled browser to display buttons in a particular style recognizable to the 3D translator device.

If the 3D-enabled browser determines that 3D CSS is available (i.e., determination block 1310="Yes"), the 3D-enabled browser may incorporate the 3D CSS into the webpage data. In an embodiment, incorporating the 3D CSS into the webpage data may include changing certain aspects of the webpage data (e.g., the buttons or other user-interface elements) into a 3D-enabled format. In other words, the webpage data may be modified to include additional 3D information for the various elements represented in the webpage data. The 3D-enabled browser may continue operating in determination block 1314.

If the 3D-enabled device determines that 3D CSS is not available (i.e., determination block 1310="No"), the 3D-enabled device may determine in determination block 1314 whether a 3D meta-element is present. In an embodiment, a 3D meta-element may be a characteristic, such as a meta-tag, that may modify the properties of an element to be displayed. For example, a 3D meta-element may be encoded as a property of a picture (e.g., "3D_enabled=true") that may enable the 3D-enabled browser to display it in such a way that the 3D translator device may identify the 3D meta-element property. In a further embodiment, the 3D meta-element may be formatting instructions for the 3D-enabled browser and may function in addition to or instead of 3D CSS. For example, a button may have a 3D meta-element have a particular 3D characteristic that differs from the default 3D characteristics defined for buttons in the 3D CSS.

If the 3D-enabled browser determines that a 3D meta-element is present (i.e., determination block 1314="Yes), the 3D-enabled browser may incorporate the 3D meta-element into the webpage data. For example, the 3D-enabled browser may implement a particular 3D meta-element when preparing to display an object defined in part by that 3D meta-element, such as a scroll bar or button. The 3D-enabled browser may continue operating in optional block 1318.

If the 3D-enabled browser determines that a 3D meta-element is not present (i.e., determination block 1314="No"), the 3D-enabled browser may optionally transmit webpage data directly to the 3D translator device in optional block 1318. In an embodiment, the 3D translator device may establish a wired or wireless data link with the 2D touchscreen device and the 3D-enabled browser may be configured to transmit webpage data directly to the 3D translator device. In a further embodiment, the 3D translator device may receive the webpage data and render the webpage on its 3D touchpanel. For example, the 3D-enabled browser may send webpage data to the 3D translator that includes instructions for displaying a 3D representation of a button.

The 3D-enabled browser may also display the webpage in block 1320. In various embodiments, the 3D-enabled browser may display the webpage on the 2D touchscreen device's display panel. In an embodiment, the 3D-enabled browser may be configured to implement at least one of the 3D CSS and 3D meta-elements when displaying the webpage. For example, the 3D-enabled browser may display a special image for a button based on the button-formatting instructions included in the 3D CSS. The 3D-enabled browser may then terminate operations in block 1322.

Figure 14:
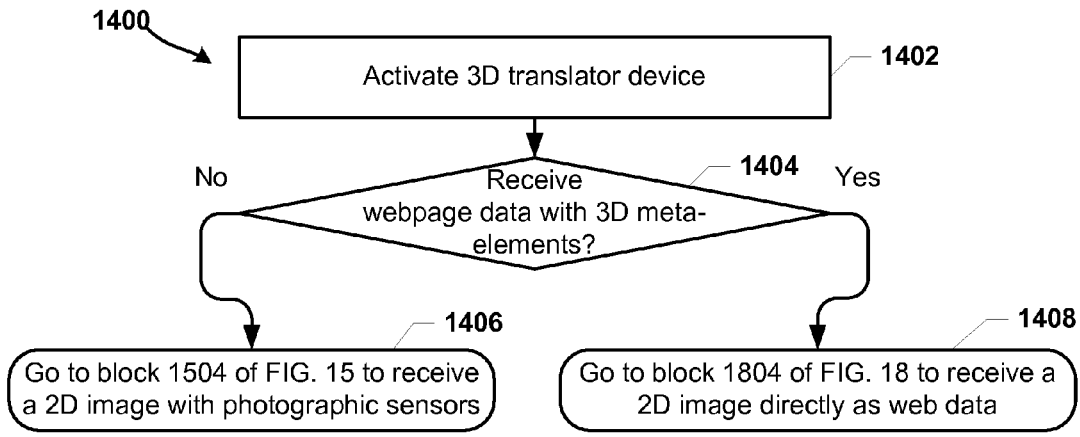
FIG. 14 is a process flow diagram illustrating an embodiment method for selecting an image data input and rendering method to implement.

FIG. 14 illustrates an embodiment 3D translator device method 1400 for selecting an image data input and rendering method to implement. In various embodiment, the 3D translator device may receive a 2D image from various sources, such as photographic sensors or directly from a 2D device as webpage data as described above. The 3D translator device may begin method 1400 by activating in block 1402.

In determination block 1404, the 3D translator device may determine whether it has received webpage data. In various embodiments, the 3D translator device may receive webpage data that includes various 2D images, such as graphics, buttons, and other aspects of typical webpages. For instance, the 3D translator device may receive webpage data directly from a website through a direct connection over the Internet or another network. In an example, the 3D translator device may maintain a wired or wireless connection to the Internet and function as a web browser. In another embodiment, the 3D translator device may receive webpage data indirectly from a 2D touchscreen device that has retrieved the webpage data through a network connection. For example, the 3D translator device may connect to the 2D touchscreen device and receive webpage data over that connection.

If the 3D translator device determines that it has received webpage data (i.e., determination block 1404="Yes"), it may transition to block 1804 from block 1408 to receive a 2D image directly as web data. In other words, the 3D translator device may represent 2D images on the 3D touchpanel without utilizing photographic sensors. For example, the 3D translator device may receive data that describes the attributes and characteristics (e.g., dimensional attributes and colors) for an entire webpage, which may include images, other graphics, animations, links, etc, and the 3D translator. The 3D translator device may, therefore, actuate the 3D touchpanel to produce 3D shapes representing the 2D images without analyzing information received from its photographic sensors.

Otherwise, if the 3D translator device determines that it has not received webpage data (i.e., determination block 1404="Yes"), it may transition to block 1504 from block 1406 to receive 2D image data with photographic sensors. In an embodiment, the 3D translator device may use its photographic sensors (e.g., cameras or pixel sensors) to obtain 2D image data.

Figure 15:
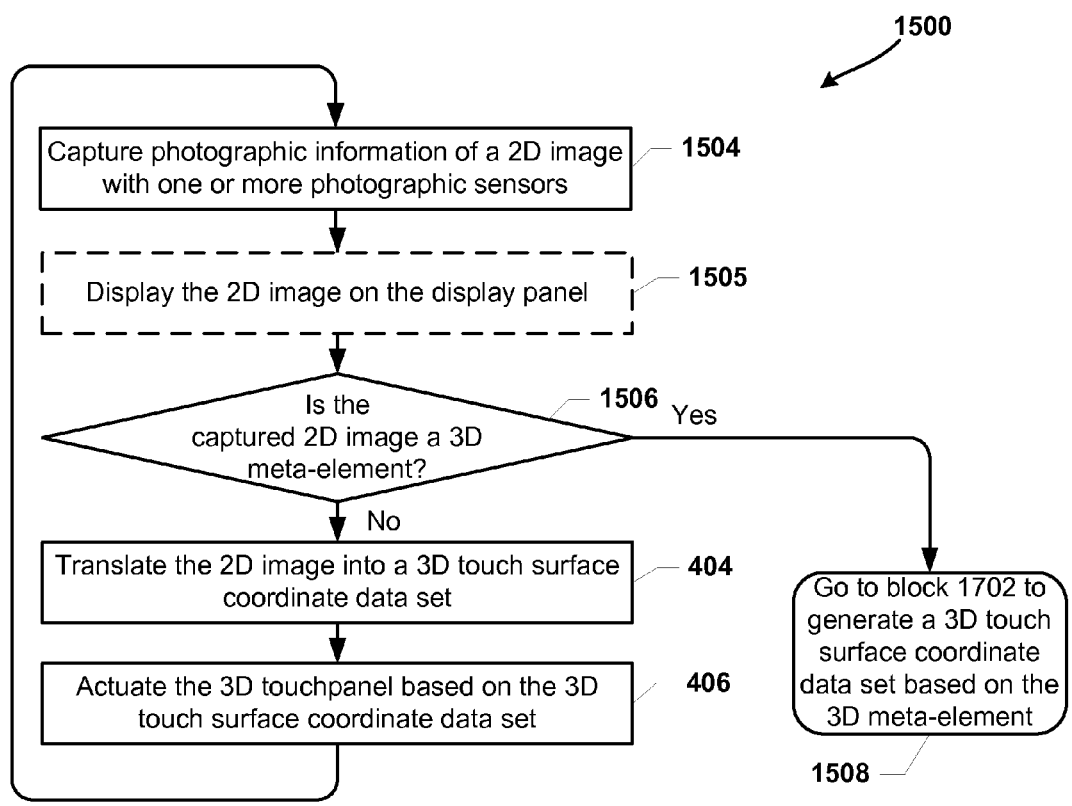
FIG. 15 is a process flow diagram illustrating an embodiment method for translating 2D image data from photographic sensors into a 3D representation on a 3D touchpanel.

FIG. 15 illustrates an embodiment 3D translator device method 1500 for translating 2D images into 3D representations when the 2D images are captured with the 3D translator device's photographic sensors. In various embodiments, the 3D translator device may utilize one or more photographic sensors to capture 2D images. These 2D images may be real objects, such as a text document or a tangible photograph or virtual objects displayed on a display panel on a 2D device.

In block 1504, the 3D translator device may capture photographic information of a 2D image with one or more photographic sensors. In an embodiment, the photographic sensors (e.g., cameras, light sensors, or pixels sensors) may be positioned on the bottom of the 3D translator device (i.e., the side opposite the 3D touchpanel) to capture 2D images underneath the 3D translator device. For example, the 3D translator device may be placed over a text document, and the photographic sensors may capture an image of the text document. In another example, the 2D images may be displayed on a display screen on, for example, a 2D touchscreen device. In another embodiment, the photographic sensors may receive light from the 2D image and convert that light into a plurality of pixels that represent the 2D image.

In optional block 1505, the 3D translator device may display the 2D image on its display panel. In an embodiment, the 3D translator device may include a display panel in which the 2D image is displayed underneath the translucent 3D touchpanel. In this embodiment, the user may be able to see and feel the 2D image as the 2D image is displayed underneath the 3D shape representing that 2D image.

In determination block 1506, the 3D translator device may determine whether the captured 2D image is a 3D meta-element. In various embodiments, a 3D meta-element may be an image, graphic, or a user-interface component displayed on a 2D touchscreen device's display panel that includes information the 3D translator device may use to generate a 3D touch surface coordinate data set. For example, a browser operating on a 2D touchscreen device may display a webpage including a standardized image of a button, which the 3D translator device may recognize as a 3D meta-element. If the 3D translator device determines that the 2D image is a 3D meta-element (i.e., determination block 1506="Yes"), the 3D translator device may transition to block 1702 from block 1508 to generate a 3D touch surface coordinate data set based on the 3D meta-element.

Otherwise (i.e., determination block 1506="No"), the 3D translator device may translate the 2D image into a 3D touch surface coordinate data set in block 404 as discussed above in relation to FIG. 4. The 3D translator device may translate the captured 2D image into a 3D touch surface coordinate data set by, for example, generating a color histogram and topological rendering, performing edge detection, or extracting 3D characteristics of the 2D image from offset stereoscopic images of the 2D image. These embodiments are discussed below in relation to FIGS. 16A-16C.

In block 406, the 3D translator device may actuate the 3D touchpanel based on the 3D touch surface coordinate data set as discussed above in relation to FIG. 4. In an embodiment, the 3D translator device may implement the 3D touch surface coordinate data set by causing the 3D touchpanel to actuate portions of the 3D touchpanel based the x, y, and z coordinate values for one or more tixels. The 3D translator device may continue operating in block 1504.

Figure 16A:
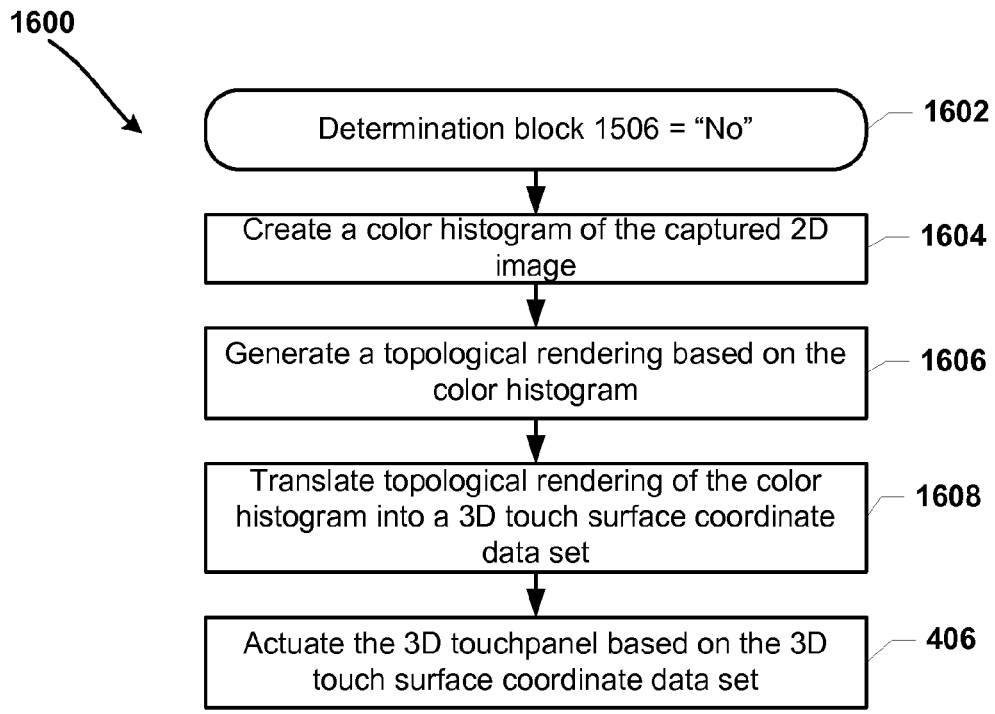
FIGS. 16A-16C are process flow diagrams illustrating embodiment methods for translating a 2D image into a 3D touch surface coordinate data set.

FIG. 16A illustrates an embodiment 3D translator device method 1600 of using a color histogram and topographical rendering to translate a captured 2D image into a 3D touch surface coordinate data set as generally described in block 404 of FIG. 4. The 3D translator device may transition to block 1602 from determination block 1506 when determination block 1506="No" (i.e., when the 2D image is not a 3D meta-element object).

In block 1604, the 3D translator device may create a color histogram of the captured 2D image. In an embodiment, the 3D translator device may distinguish between the different color values of the plurality of pixels comprising the 2D image as received from the photographic sensors (e.g., a digital camera). In a further embodiment, the color histogram may separate pixel colors by their RGB value. For example, the 3D translator device may determine which pixels have a RGB triplet value of (255,0,0).

In block 1606, the 3D translator device may generate a topological rendering based on the color histogram. In an embodiment, the 3D translator device may assign different values to different colors. For example, a dark red may be associated with a higher value than a light red or a yellow.

In block 1608, the 3D translator device may translate the topological rendering values into a 3D touch surface coordinate data set. In an embodiment, the 3D translator device may associate an actuation value, or z-coordinate value, to one or more pixels in the 2D image based on its rendering value. For example, the 3D translator device may associate a pixel with a dark red color with a z-coordinate value that may correspond to a height of three millimeters. In a further embodiment, the 3D translator device may associate one or more tixels on the 3D touchpanel with the pixels in the 2D image and their respective x-, y-, and z-coordinate values.

In another embodiment, the 3D translator device may normalize the histogram data to use the intensity of the colors in the 2D image to determine the extent to which one or more tixels should be actuated (i.e., the tixels' z-coordinate value). As part of the normalization process, the 3D translator device may consider color differentials, in addition to intensity, since there may be multiple colors of the same intensity, and the 3D translator device may differentiate between multiple colors when generating the 3D touch surface coordinate data set. Thus, this embodiment can generate a three dimensional representation of colors in the 2D image.

The 3D translator device may also actuate the 3D touchpanel based on the 3D touch surface coordinate data set in block 406 as discussed above in relation to FIG. 4.

Figure 16B:
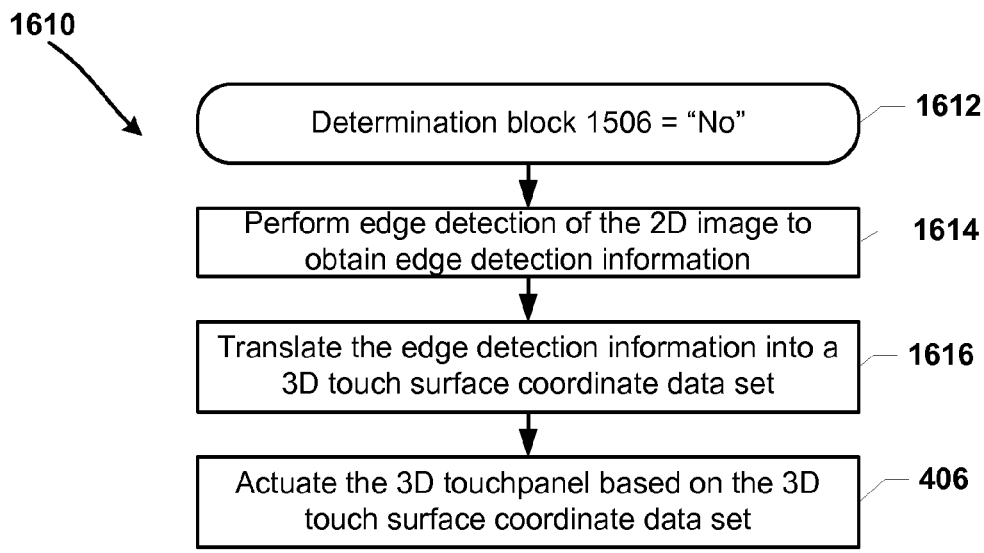

FIG. 16B illustrates an embodiment 3D translator device method 1610 of performing edge detection to translate a captured 2D image into a 3D touch surface coordinate data set as generally described in block 404 of FIG. 4. The 3D translator device may transition to block 1612 from determination block 1506 when determination block 1506="No" (i.e., when the 2D image is not a 3D meta-element).

In block 1614, the 3D translator device may perform edge detection of the 2D image. In an embodiment, the 3D translator device may determine the edges of the 2D image according to several known techniques (e.g., Canny edge detection). By detecting the edges of the 2D image, the 3D translator device may determine differing height levels within the 2D image, which may be labeled as edge detection information.

In block 1616, the 3D translator device may translate the edge detection information of the 2D image into a 3D touch surface coordinate data set. In an embodiment, the 3D translator device may associate the edges in the 2D image with a z-coordinate value that indicates a greater height than non-edge areas in the 2D image. For example, in a simple embodiment, the 3D translator device may associate the edges of the 2D image with a maximum height (i.e., maximum z-coordinate value) and the non-edge areas with a minimum height. Thus, the 3D translator device may generate a 3D touch surface coordinate data set by assigning tixels a z-coordinate value based on whether the tixel is associated with an edge in the 2D image.

The 3D translator device may also actuate the 3D touchpanel based on the 3D touch surface coordinate data set in block 406 as discussed above in relation to FIG. 4.

Figure 16C:
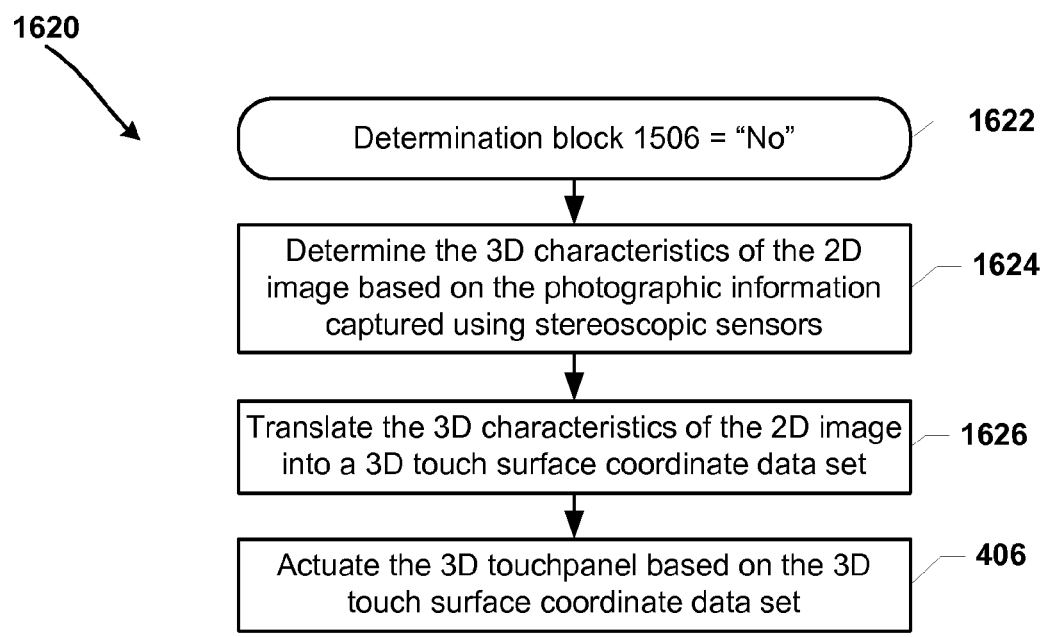

FIG. 16C illustrates an embodiment 3D translator device method 1620 for using offset images obtained with stereoscopic cameras to translate a 2D image into a 3D touch surface coordinate data set as generally described in block 404 of FIG. 4. The 3D translator device may transition to block 1622 from determination block 1506 when determination block 1506="No" (i.e., when the 2D image is not a 3D meta-element).

In block 1624, the 3D translator device may determine the 3D characteristics of the 2D image based on the photographic information captured using stereoscopic sensors. In an embodiment, the 3D translator device may include a plurality of stereoscopic sensors that capture offset images of 2D images. The 3D translator device may use the offset images to determine various height characteristics of the 2D image. For example, the 3D translator device may determine the various heights at different locations in a 2D image based on the differences in the offset images. In another embodiment, rather than capturing offset images of 2D images, the 3D translator device may capture offset images of real-world three-dimensional objects and represent those real-world three-dimensional objects on the 3D touchpanel. For example, the 3D translator device's stereoscopic cameras may capture offset images of a disk and determine the disk's height based on the difference between the offset images.

In block 1626, the 3D translator device may translate the 3D characteristics of the 2D image into a 3D touch surface coordinate data set. In an embodiment, the 3D translator device may assign the various heights in the 2D image to tixels that are associated with those locations in the 2D image.

The 3D translator device may also actuate the 3D touchpanel based on the 3D touch surface coordinate data set in block 406 as discussed above in relation to FIG. 4.

Figure 17:
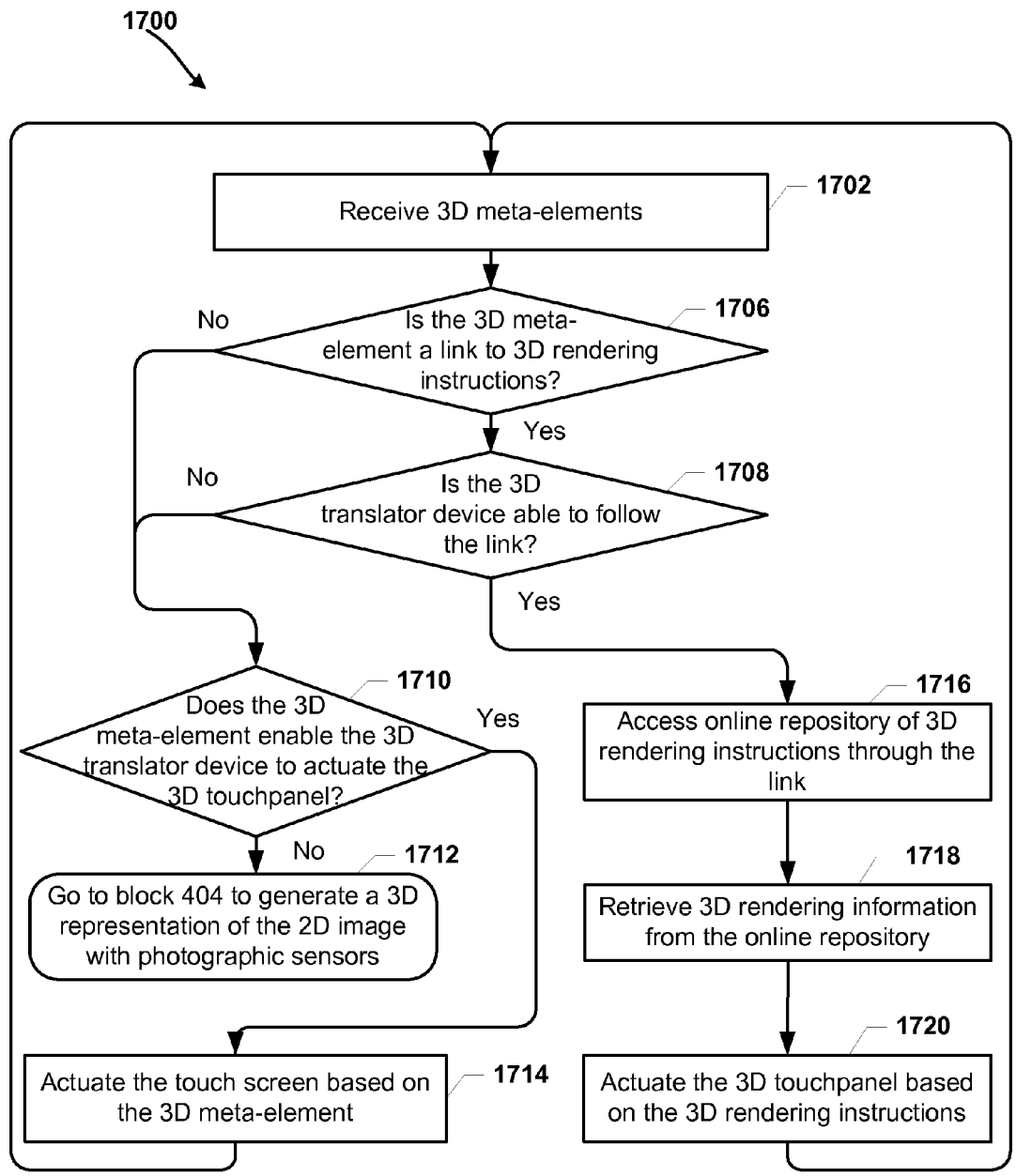
FIG. 17 is a process flow diagram illustrating an embodiment method for actuating a 3D touchpanel based on the 3D meta-data.

FIG. 17 illustrates an embodiment 3D translator device method 1700 for translating a 2D image into a 3D shape using 3D meta-elements. In various embodiments, the 3D translator device may obtain 3D meta-elements that instruct how a 3D shape should be formed on a 3D touchpanel, and the 3D translator device may actuate the 3D touchpanel to deform a deformable surface according to those instructions.

The 3D translator device may receive 3D meta-elements in block 1702. In determination block 1706, the 3D translator device may determine whether the 3D meta-element is a link to 3D rendering instructions. In an embodiment, 3D rendering instructions may be instructions that enable the 3D touchpanel to actuate the deformable surface to form a particular 3D shape. In another embodiment, the 3D rendering instructions may be in the form of a 3D touch surface coordinate data set. For example, a 3D meta-element may be a link to an online repository that includes a 3D touch surface coordinate data set that the 3D translator device may use to actuate the 3D touchpanel into the shape of a 3D star. In still another embodiment, a 3D meta-element link may be a way to convey the 3D shape of a particular 2D image (e.g., a 2D star image) to the 3D translator without the 3D translator device needing to use photographic sensors.

If the 3D meta-element is not a link to 3D rendering instructions (i.e., determination block 1706="No"), the 3D translator device may continue operating in determination block 1710. Otherwise (i.e., determination block 1706="Yes"), the 3D translator device may determine in determination block 1708 whether the 3D translator device is able to follow the link. In an embodiment, the link may be to an online repository of 3D rendering instructions accessible through a network connection. In another embodiment, the 3D translator device may be configured to connect directly to the Internet or another network. The 3D translator device may also, for example, leverage a network connection established by a 2D touchscreen device with which the 3D translator device is in communication (i.e., the 2D touchscreen device serves as an intermediary between the 3D translator device and the network).

If the 3D translator device is unable to follow the link (i.e., determination block="No"), the 3D translator device may determine in determination block 1710 whether the 3D meta-element enables the 3D translator device to actuate the 3D touchpanel. In various embodiments, the 3D meta-element may be implemented on various webpages by various webmasters or website designers. In an embodiment, the 3D meta-element's instructions or "value" may enable the 3D translator device to cause the 3D touchpanel to actuate the deformable surface into a particular 3D shape. In a further embodiment, the 3D meta-element's instructions may be a 3D touch surface coordinate data set. In another embodiment, the 3D meta-element's instructions may not be a 3D touch surface coordinate data set but may provide the 3D translator device with enough information to form a 3D touch surface coordinate data set based on the 3D meta-element's instructions. For example, the 3D meta-element's instructions may describe the varying heights and locations of the shape to be represented on the 3D touchpanel.

In another embodiment, the 3D translator device may recognize a 3D meta-element but be unable to form a shape on the 3D touchpanel based on the 3D meta-element because of a flaw or error in the encoding of the 3D meta-element's instructions. For example, in an embodiment in which the 3D meta-element is implemented in manner similar to 2D meta-tags, the 3D translator device may recognize the 3D meta-element "tag," but because of a coding error cannot interpret the instructions or "value" or the 3D meta-element tag.

If the 3D meta-element enables the 3D translator device to actuate the 3D touchpanel into the appropriate 3D shape (i.e., determination block 1710="Yes"), in block 1714, the 3D translator device may actuate the 3D touchpanel based on the 3D meta-element. In an embodiment, as discussed above, the 3D translator device may use the 3D meta-element to create a 3D touch surface coordinate data set used to actuate the 3D touchpanel into the desired 3D shape. The 3D translator device may continue operating in block 1702. If, however, the 3D meta-element does not enable the 3D translator device to actuate the 3D touchpanel (i.e., determination block 1710="No"), the 3D translator device may transition to block 404 from block 1712 to generate a 3D representation of the 2D image with photographic sensors.

If the 3D translator device is able to follow the link (i.e., determination block 1708="Yes"), the 3D translator device may access the online repository of 3D rendering instructions through the link in block 1716. In block 1718, the 3D translator device may retrieve the 3D rendering information from the online repository. In an embodiment, the 3D translator device may request specific 3D rendering instructions based on the identity value of the 3D meta-element. For example, if the identity value of the 3D meta-element is "3D horseshoe shape," the 3D translator may request 3D rendering instructions for a "3D horseshoe shape." In another example, the 3D meta-element's identity value may be any value associated with the 3D rendering instructions for a particular 3D shape. In another embodiment, the 3D meta-element link may send the 3D translator device directly to the 3D rendering instructions.

In block 1720, the 3D translator device may actuate the 3D touchscreen based on the 3D rendering instructions. In an embodiment, the 3D rendering instructions may be a 3D touch surface coordinate data set for a particular 3D shape. In another embodiment, the 3D rendering instructions may enable the 3D translator device to create a 3D touch surface coordinate data set based on the rendering instructions without implementing a 3D touch surface coordinate data set. The 3D translator device may continue operating in block 1702.

Figure 18:
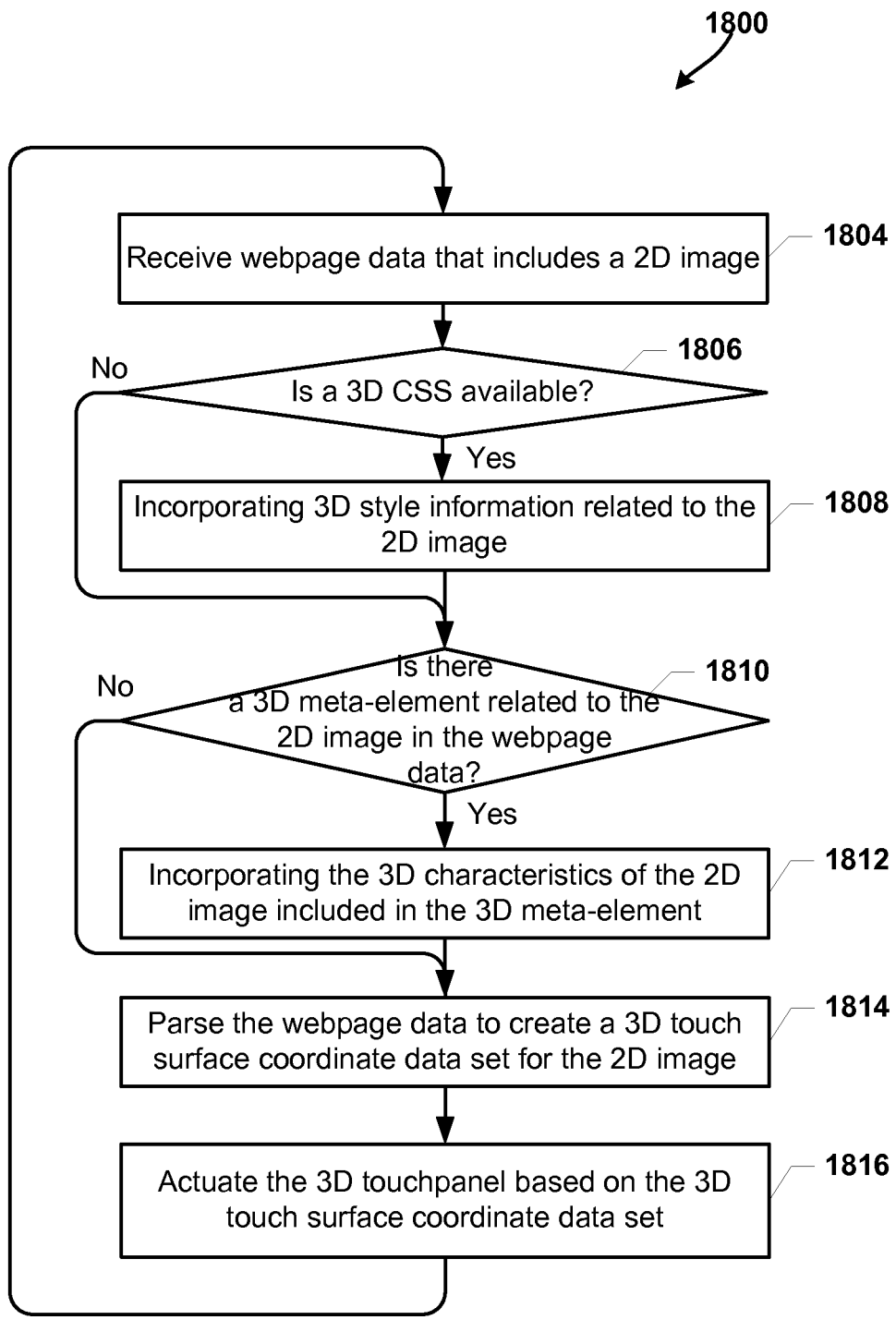
FIG. 18 is a process flow diagram illustrating an embodiment method for actuating a 3D touchpanel based on webpage data.

FIG. 18 illustrates an embodiment 3D translator device method 1800 for translating a 2D image into a 3D representation based on webpage data. In various embodiments, the 3D translator device may obtain webpage data from various sources. In an embodiment, the 3D translator device may be in communication with a 2D touchscreen device connected to a network (e.g., the Internet), and the 3D translator device may receive webpage data from the 2D touchscreen device. In another embodiment, the 3D translator device may be directly connected to a network, such as the Internet, and may directly access webpage data in a manner similar to a typical web browser.

In another embodiment, the webpage data may include various 2D images. For example, the webpage data may include browser objects like buttons, scroll bars, graphics animations, address bars, and various other objects typically seen on a webpage.

In block 1804, the 3D touchscreen panel may receive webpage data that includes a 2D image. For example, the 3D touchpanel may receive webpage data that includes a button. In determination block 1806, the 3D translator device may determine whether a 3D CSS is available. In an embodiment, 3D CSS may be a cascading style sheet that includes 3D style information related to a 2D image, wherein the 3D style information may include information the 3D translator device may use to actuate the 3D touchpanel into a 3D shape that represents the 2D image. In this embodiment, the 3D CSS may provide the 3D translator device with instructions on how to create 3D shapes of 2D images similar to how a traditional CSS describes various presentation semantics. For instance, the 3D CSS may include 3D touch surface coordinate data sets for various 2D objects (e.g., buttons or scroll bars) or for the overall layout of the webpage that the 3D translator device may use to actuate the 3D touchpanel into forming 3D shapes that represent the browser objects or the webpage as a whole.

If the 3D translator device determines that 3D CSS is available (i.e., determination block 1806="Yes"), the 3D translator device may incorporate 3D style information related to the 2D image in block 1808. The 3D translator device may continue operating in determination block 1810.

If the 3D translator device determines that 3D CSS is not available (i.e., determination block 1806="No"), the 3D translator device may determine in determination block 1810 whether there is a 3D meta-element related to the 2D image in the webpage data. In an embodiment, the webpage data may include one or more 3D meta-elements that include additional information (i.e., 3D characteristics) that the 3D translator device may use to form a 3D shape of the 2D image. In an embodiment, a 3D meta-element may cause the 3D translator device to render a particular 3D shape to represent the 2D image. For example, a 3D meta-element may include 3D touchpanel coordinate data values that the 3D translator device may use to actuate the 3D touchpanel into a particular 3D shape. In another embodiment, the 3D meta-element may cause the 3D translator device to render a different 3D representation than the 3D rendering instructions included in the 3D CSS.

If the 3D translator device determines that there is a 3D meta-element related to the 2D image in the webpage data (i.e., determination block 1810="Yes"), the 3D translator device may incorporate the 3D characteristics of the 2D image included in the 3D meta-element in block 1812. The 3D translator device may then continue operating in block 1814.

Otherwise, if the 3D translator device determines that there is no 3D meta-element related to the browser object in the webpage data (i.e., determination block 1810="No"), the 3D translator device may parse the webpage data to create a 3D touch surface coordinate data set for the 2D image in block 1814. In various embodiments, the 3D translator device may be configured to parse the webpage data to determine the characteristics of the 2D image. For example, the webpage data may include the color, shape, and size of the 2D image. In another example, the webpage data may include a digital image of the 2D image (e.g., a picture file for a graphic browser object) that the 3D translator device may use to create a color histogram and topographical rendering or perform edge detection as discussed above in relation to FIGS. 16A and 16B. In another embodiment, the 3D translator device may use one or more of the parsed webpage data, the 3D meta-elements or the 3D CSS to create the 3D touch surface coordinate data set for the browser object.

In block 1816, the 3D translator device may actuate the 3D touchpanel based on the 3D touch surface coordinate data set for the browser object. In an embodiment, the 3D translator device may use the 3D touch surface coordinate data set to actuate the 3D touchpanel into forming a 3D shape representative of the 2D image. The 3D translator device may continue operating in block 1804.

Figure 19:
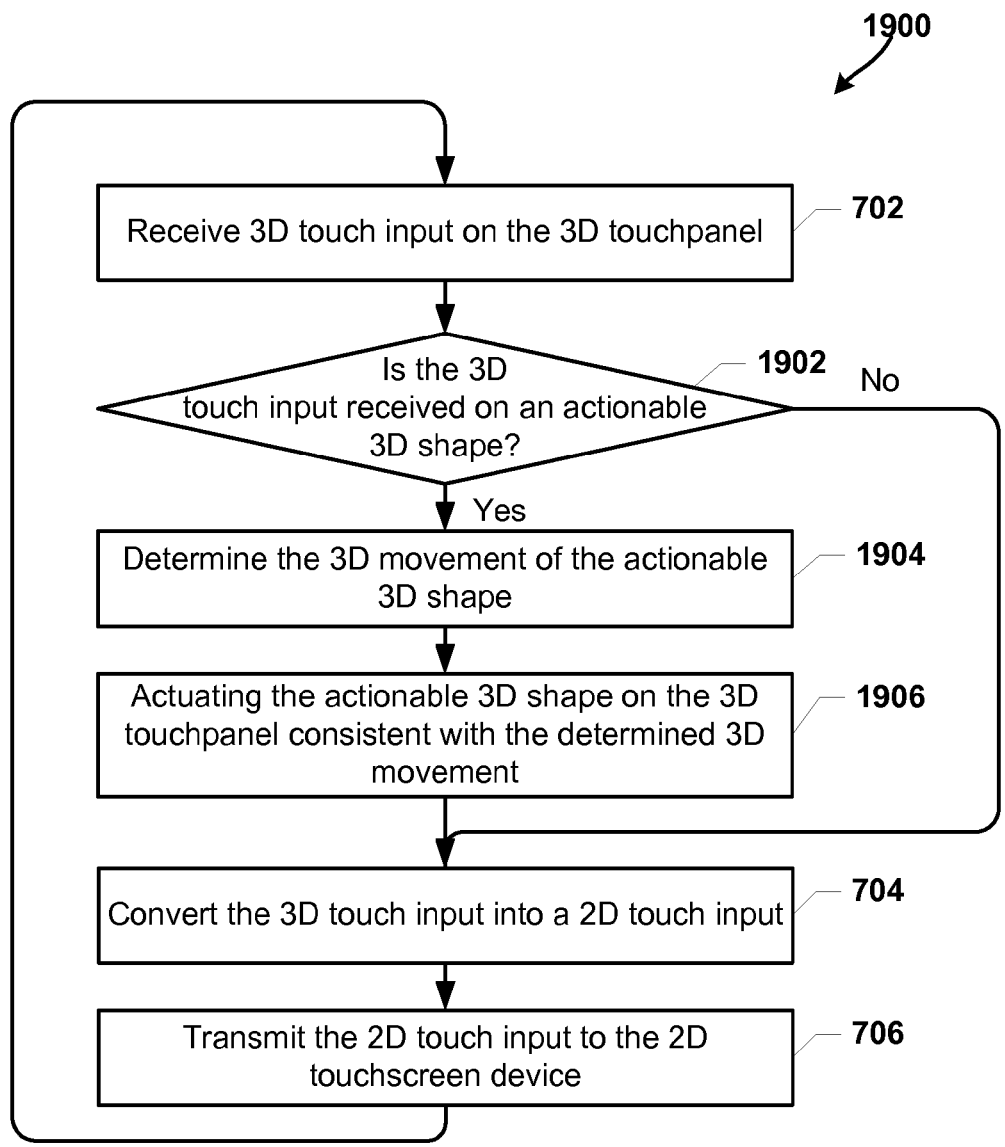
FIG. 19 is a process flow diagram illustrating an embodiment method for translating a 3D touch input into a 2D touch input when a 3D touch input is received on an actionable 3D shape.

FIG. 19 illustrates an embodiment 3D translator device method 1900 for implementing a 3D movement for a 3D shape that receives a 3D touch input when translating the 3D touch input into a 2D touch input. In block 702, the 3D translator device may receive a 3D touch input on the 3D touch panel. As discussed above in relation to FIG. 7, the 3D translator device may detect the 3D touch input on the 3D touchpanel using various techniques, such as projected capacitance or resistive touchscreen panel.

The 3D translator device may also determine in determination block 1902 whether the 3D touch input was received on an actionable 3D shape. In an embodiment, an actionable 3D shape may be a 3D shape that represents an actionable browser object, such as a button, scroll bar, link, etc. In another embodiment, the 3D translator device may determine that the 3D shape represents an actionable browser object through various means, such as by using a 3D meta-element to identify the 2D image represented by the 3D shape as an actionable browser object. If the 3D translator device determines that the 3D touch input is not received on an actionable 3D shape (i.e., determination block 1902="No"), the 3D translator device may continue operating in block 704.

Otherwise (i.e., determination block 1902="Yes"), the 3D translator device may determine the 3D movement of the actionable 3D shape in block 1904. In an embodiment, the 3D translator device may associate a particular 3D movement with the type of actionable browser object that the actionable 3D shape represents. For example, the 3D translator device may associate an upward and downward 3D movement with a button, and a side-to-side 3D movement with a scroll bar. In another embodiment, the 3D translator device may detect the movement or gesture of the user's 3D touch input. For example, the 3D translator device may determine that a user is dragging her finger in a particular direction.

In block 1906, the 3D translator device may actuate the actionable 3D shape on the 3D touchpanel in a manner consistent with the determined 3D movement. For example, when a user touches a 3D shape representing a button, the 3D translator device may lower the 3D shape to simulate pressing a button. In another example in which the user is dragging her finger on a 3D shape representing a scroll bar, the 3D translator device may determine the direction of the user's touch and actuate the 3D touchpanel to cause tixels in front of the user's finger to rise while tixels behind the user's finger movement sink such that it appears that the 3D shape is moving with the user's finger. The 3D translator device may continue in block 704.

In block 704, the 3D translator device may convert the 3D touch input into a 2D touch input. In various embodiments, the 3D translator device may perform this step by determining the location on the 2D touchscreen device that corresponds with the location on the 3D touchpanel that detected the user's touch. In an embodiment, the 3D translator device may be configured to detect the 3D touch input based on, for example, a change in capacitance or a change in pressure caused by the force exerted by the user's finger that the 3D touchpanel measures. The 3D translator device may also determine the location of the 3D touch input based on the measured change.

In block 706, the 3D translator device may communicate the 2D touch input to a 2D touchscreen device as discussed in relation to FIG. 7. The 3D translator device may continue operating in block 702.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any 2D processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more aspects, the functions described may be implemented in hardware, software, firmware, or any combination thereof. If implemented in software, the functions may be stored as one or more instructions or code (e.g., processor-executable instructions) on a non-transitory computer-readable medium or non-transitory processor-readable medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A three-dimensional (3D) translator device configured to translate a two-dimensional (2D) image into a 3D shape on a 3D touchpanel, comprising:
    a photographic sensor;
    the 3D touchpanel configured to actuate individuals portions of a deformable surface; and
    a processor coupled to the photographic sensor and the 3D touchpanel, wherein the processor is configured with processor-executable instructions to perform operations comprising:
        capturing the 2D image with the photographic sensor;
        creating a color histogram of the captured 2D image;
        generating a topological rendering of the color histogram;
        translating the topological rendering of the color histogram into a 3D touch surface coordinate data set; and
        actuating the 3D touchpanel based on the 3D touch surface coordinate data set.

2. The 3D translator device of claim 1, wherein the processor is configured with processor-executable instructions to perform operations such that the photographic sensor is selected from a group of at least one of cameras, light sensors, and stereoscopic photographic sensors.

3. A three-dimensional (3D) translator device configured to translate a two-dimensional (2D) image into a 3D shape on a 3D touchpanel, comprising:
    a photographic sensor;
    the 3D touchpanel configured to actuate individuals portions of a deformable surface; and
    a processor coupled to the photographic sensor and the 3D touchpanel, wherein the processor is configured with processor-executable instructions to perform operations comprising:
        capturing the 2D image with the photographic sensor;
        performing edge detection of the 2D image;
        obtaining edge detection information based on the performed edge detection of the 2D image;
        translating the edge detection information into a 3D touch surface coordinate data set; and
        actuating the 3D touchpanel based on the 3D touch surface coordinate data set.

4. A three-dimensional (3D) translator device configured to translate stereoscopic images into a 3D shape on a 3D touchpanel, comprising:
    stereoscopic photographic sensors;
    the 3D touchpanel configured to actuate individuals portions of a deformable surface; and
    a processor coupled to the stereoscopic photographic sensors and the 3D touchpanel, wherein the processor is configured with processor-executable instructions to perform operations comprising:
        capturing stereoscopic images with the stereoscopic photographic sensors;
        determining 3D characteristics of the captured stereoscopic images;
        translating the 3D characteristics into a 3D touch surface coordinate data set; and
        actuating the 3D touchpanel based on the 3D touch surface coordinate data set.

5. A three-dimensional (3D) translator device configured to translate a two-dimensional (2D) image into a 3D shape on a 3D touchpanel, comprising:
    a photographic sensor;
    the 3D touchpanel configured to actuate individuals portions of a deformable surface; and
    a processor coupled to the photographic sensor and the 3D touchpanel, wherein the processor is configured with processor-executable instructions to perform operations comprising:
        capturing the 2D image with the photographic sensor;
        determining whether the captured 2D image is a 3D meta-element;
        determining whether the captured 2D image is a link to 3D rendering instructions when it is determined that the 2D image is a 3D meta-element;
        determining whether the 3D translator device is able to follow the link when it is determined that the captured 2D image is a link to 3D rendering instructions;
        actuating the 3D touchpanel based on the 3D rendering instructions when it is determined that the 3D translator device is able to follow the link; and generating a 3D touch surface coordinate data set based on the 3D meta-element and actuating the 3D touchpanel based on the 3D touch surface coordinate data set when it is determined that the 3D meta-element is not a link to 3D rendering instructions.

6. The 3D translator device of claim 5, wherein the processor is configured with processor-executable instructions to perform operations such that actuating the 3D touchpanel based on the 3D rendering instructions comprises:
accessing an online repository of 3D rendering instructions through the link;
retrieving 3D rendering instructions from the online repository; and
actuating the 3D touchpanel based on the retrieved 3D rendering instructions.

7. The 3D translator device of claim 5, wherein the processor is configured with processor-executable instructions to perform operations further comprising:
determining whether the 3D meta-element enables the 3D translator device to actuate the 3D touchpanel when it is determined that the 3D meta-element is not the link to 3D rendering instructions or that the 3D translator device is unable to follow the link;
generating a 3D representation of the 2D image obtained with the photographic sensor when it is determined that the 3D meta-element does not enable the 3D translator device to actuate the 3D touchpanel; and
actuating the 3D touchpanel based on the 3D meta-element when it is determined that the 3D meta-element enables the 3D translator device to actuate the 3D touchpanel.

8. The 3D translator device of claim 1, wherein the processor is configured with processor-executable instructions to perform operations further comprising:
receiving a 3D touch input on the 3D touchpanel;
converting the 3D touch input into a 2D touch input; and
communicating the 2D touch input.

9. The 3D translator device of claim 8, wherein the processor is configured with processor-executable instructions to perform operations such that converting the 3D touch input into a 2D touch input comprises performing at least one of the following to communicate the 2D touch input to a 2D touchscreen device:
actuating one or more mechanical fingers configured to touch a location of the 2D touchscreen device's touchpanel that corresponds with the location of the 3D touch input;
sending a signal to the 2D touchscreen device indicating the location on the 2D touchscreen device's touch panel corresponding with the 3D touch input; and
actuating an e-stim that creates a simulated 2D touch input at the location on the 2D touchscreen device's touchpanel corresponding to the 3D touch by changing electrical properties at the location.

10. A three-dimensional (3D) translator device configured to translate a two-dimensional (2D) image into a 3D shape on a 3D touchpanel, comprising:
a photographic sensor;
the 3D touchpanel configured to actuate individuals portions of a deformable surface; and
a processor coupled to the photographic sensor and the 3D touchpanel, wherein the processor is configured with processor-executable instructions to perform operations comprising:
capturing the 2D image with the photographic sensor;
translating the captured 2D image into a 3D touch surface coordinate data set by determining image characteristics of the captured 2D image;
actuating the 3D touchpanel based on the 3D touch surface coordinate data set;
receiving a 3D touch input on the 3D touchpanel;
converting the 3D touch input into a 2D touch input;
communicating the 2D touch input;
determining whether the 3D touch input was received on an actionable 3D shape; and
actuating the 3D touchpanel when it is determined that the 3D touch input was received on the actionable 3D shape.

11. The 3D translator device of claim 10, wherein the processor is configured with processor-executable instructions to perform operations such that actuating the 3D touchpanel comprises:
determining the 3D movement of the actionable 3D shape; and
actuating the actionable 3D shape in a manner consistent with the determined 3D movement.

12. The 3D translator device of claim 1, wherein the 3D translator device further comprises a display panel, and wherein the processor is configured with processor-executable instructions to perform operations further comprising displaying the 2D image on the display panel.

13. A method of translating a two-dimensional (2D) image into a three-dimensional (3D) shape on a 3D touchpanel, comprising:
capturing the 2D image with a photographic sensor;
creating a color histogram of the captured 2D image;
generating a topological rendering of the color histogram;
translating the topological rendering of the color histogram into a 3D touch surface coordinate data set; and
actuating the 3D touchpanel based on the 3D touch surface coordinate data set.

14. The method of claim 13, wherein the photographic sensor is selected from a group of at least one of cameras, light sensors, and stereoscopic photographic sensors.

15. A method of translating a two-dimensional (2D) image into a three-dimensional (3D) shape on a 3D touchpanel, comprising:
capturing the 2D image with a photographic sensor;
performing edge detection of the 2D image;
obtaining edge detection information based on the performed edge detection of the 2D image;
translating the edge detection information into the 3D touch surface coordinate data set; and
actuating the 3D touchpanel based on the 3D touch surface coordinate data set.

16. A method of translating stereoscopic images into a three-dimensional (3D) shape on a 3D touchpanel, comprising:
capturing stereoscopic images with stereoscopic photographic sensors;
determining 3D characteristics of the captured stereoscopic images;
translating the 3D characteristics into a 3D touch surface coordinate data set; and
actuating the 3D touchpanel based on the 3D touch surface coordinate data set.

17. A method of translating a two-dimensional (2D) image into a three-dimensional (3D) shape on a 3D touchpanel, comprising:
capturing the 2D image with a photographic sensor;
determining whether the captured 2D image is a 3D meta-element;
determining whether the 3D meta-element is a link to 3D rendering instructions when it is determined that the 2D image is a 3D meta-element;

determining whether the 3D translator device is able to follow the link when it is determined that the 3D meta-element is a link to 3D rendering instructions;

actuating the 3D touchpanel based on the 3D rendering instructions when it is determined that the 3D translator device is able to follow the link; and generating a 3D touch surface coordinate data set based on the 3D meta-element and actuating the 3D touchpanel based on the generated 3D touch surface coordinate data set when it is determined that the 3D meta-element is not a link to 3D rendering instructions.

18. The method of claim 17, wherein actuating the 3D touchpanel based on the 3D rendering instructions comprises:
   accessing an online repository of 3D rendering instructions through the link;
   retrieving 3D rendering instructions from the online repository; and
   actuating the 3D touchpanel based on the retrieved 3D rendering instructions.

19. The method of claim 17, further comprising:
   determining whether the 3D meta-element enables the 3D translator device to actuate the 3D touchpanel when it is determined that the 3D meta-element is not the link to 3D rendering instructions or that the 3D translator device is unable to follow the link;
   generating a 3D representation of the 2D image obtained with the photographic sensor when it is determined that the 3D meta-element does not enable the 3D translator device to actuate the 3D touchpanel; and
   actuating the 3D touchpanel based on the 3D meta-element when it is determined that the 3D meta-element enables the 3D translator device to actuate the 3D touchpanel.

20. The method of claim 19, wherein generating a 3D representation of the 2D image obtained with the photographic sensor comprises:
   translating the 3D meta-element into the 3D touch surface coordinate data set; and
   actuating the 3D touchpanel based on the 3D touch surface coordinate data set.

21. The method of claim 17, further comprising:
   receiving a 3D touch input on the 3D touchpanel;
   converting the 3D touch input into a 2D touch input; and
   communicating the 2D touch input.

22. The method of claim 21, wherein converting the 3D touch input into a 2D touch input comprises performing at least one of the following to communicate the 2D touch input to a 2D touchscreen device:
   actuating one or more mechanical fingers configured to touch a location of the 2D touchscreen device's touchpanel that corresponds with the location of the 3D touch input;
   sending a signal to the 2D touchscreen device indicating the location on the 2D touchscreen device's touch panel corresponding with the 3D touch input; and
   actuating an e-stim that creates a simulated 2D touch input at the location on the 2D touchscreen device's touchpanel corresponding with the 3D touch by changing electrical properties at the location.

23. The method of claim 21, further comprising:
   determining whether the 3D touch was received on an actionable 3D shape; and
   actuating the 3D touchpanel when it is determined that the 3D touch input was received on the actionable 3D shape.

24. The method of claim 23, wherein actuating the 3D touchpanel comprises:
   determining the 3D movement of the actionable 3D shape; and
   actuating the actionable 3D shape in a manner consistent with the determined 3D movement.

25. The method of claim 13, further comprising displaying the 2D image on a display panel.

26. A three-dimensional (3D) translator device configured to translate a two-dimensional (2D) image into a 3D shape on a 3D touchpanel, comprising:
   means for capturing a 2D image;
   means for creating a color histogram of the captured 2D image;
   means for generating a topological rendering of the color histogram; and
   means for translating the topological rendering of the color histogram into the 3D touch surface coordinate data set: and
   means for actuating the 3D touchpanel based on the 3D touch surface coordinate data.

27. The 3D translator device of claim 26, wherein means for capturing a 2D image comprises one of a camera, light sensors, and stereoscopic photographic sensors.

28. A three-dimensional (3D) translator device configured to translate a two-dimensional (2D) image into a 3D shape on a 3D touchpanel, comprising:
   means for capturing a 2D image;
   means for performing edge detection of the 2D image;
   means for obtaining edge detection information based on the performed edge detection of the 2D image;
   means for translating the edge detection information into a 3D touch surface coordinate data set; and
   means for actuating the 3D touchpanel based on the 3D touch surface coordinate data.

29. A three-dimensional (3D) translator device configured to translate a two-dimensional (2D) image into a 3D shape on a 3D touchpanel, comprising:
   means for capturing stereoscopic images;
   means for determining 3D characteristics of the captured stereoscopic images;
   means for translating the 3D characteristics into a 3D touch surface coordinate data set; and
   means for actuating the 3D touchpanel based on the 3D touch surface coordinate data.

30. The 3D translator device of claim 26, further comprising:
   means for determining whether the captured 2D image is a 3D meta-element; and
   means for generating the 3D touch surface coordinate data set based on the 3D meta-element when it is determined that the 2D image is a 3D meta-element.

31. A three-dimensional (3D) translator device configured to translate a two-dimensional (2D) image into a 3D shape on a 3D touchpanel, comprising:
   means for capturing a 2D image;
   determining whether the captured 2D image is a 3D meta-element;
   means for determining whether the 3D meta-element is a link to 3D rendering instructions when it is determined that the 2D image is a 3D meta-element;
   means for determining whether the 3D translator device is able to follow the link when it is determined that the 3D meta-element is a link to 3D rendering instructions;
   means for actuating the 3D touchpanel based on the 3D rendering instructions when it is determined that the 3D translator device is able to follow the link;
   means for generating a 3D touch surface coordinate data set based on the 3D meta-element when it is determined that the 3D meta-element is not a link to 3D rendering instructions; and means for actuating the 3D touchpanel based on the generated 3D touch surface coordinate data set.

32. The 3D translator device of claim 31, wherein means for actuating the 3D touchpanel based on the 3D rendering instructions comprises:
    means for accessing an online repository of 3D rendering instructions through the link;
    means for retrieving 3D rendering instructions from the online repository; and
    means for actuating the 3D touchpanel based on the retrieved 3D rendering instructions.

33. The 3D translator device of claim 31, further comprising:
    means for determining whether the 3D meta-element enables the 3D translator device to actuate the 3D touchpanel when it is determined that the 3D meta-element is not the link to 3D rendering instructions or that the 3D translator device is unable to follow the link;
    means for generating a 3D representation of the 2D image obtained with a photographic sensor when it is determined that the 3D meta-element does not enable the 3D translator device to actuate the 3D touchpanel; and
    means for actuating the 3D touchpanel based on the 3D meta-element when it is determined that the 3D meta-element enables the 3D translator device to actuate the 3D touchpanel.

34. The 3D translator device of claim 33, wherein means for generating a 3D representation of the 2D image obtained with the photographic sensor comprises:
    means for translating the 3D meta-element into the 3D touch surface coordinate data set; and
    means for actuating the 3D touchpanel based on the 3D touch surface coordinate data set.

35. The 3D translator device of claim 31, further comprising:
    means for receiving a 3D touch input on the 3D touchpanel;
    means for converting the 3D touch input into a 2D touch input; and
    means for communicating the 2D touch input.

36. The 3D translator device of claim 35, wherein means for converting the 3D touch input into a 2D touch input comprises at least one of:
    means for actuating one or more mechanical fingers configured to touch a location of the 2D touchscreen device's touchpanel that corresponds with the location of the 3D touch input;
    means for sending a signal to the 2D touchscreen device indicating the location on the 2D touchscreen device's touch panel corresponding with the 3D touch input; and
    means for actuating an e-stim that creates a simulated 2D touch input at the location on the 2D touchscreen device's touchpanel corresponding with the 3D touch by changing electrical properties at the location.

37. The 3D translator device of claim 35, further comprising:
    means for determining whether the 3D touch input was received on an actionable 3D shape; and
    means for actuating the 3D touchpanel when it is determined that the 3D touch input was received on the actionable 3D shape.

38. The 3D translator device of claim 37, wherein means for actuating the 3D touchpanel comprises:
    means for determining the 3D movement of the actionable 3D shape; and
    means for actuating the actionable 3D shape in a manner consistent with the determined 3D movement.

39. The 3D translator device of claim 37, further comprising means for displaying the 2D image.

40. A non-transitory processor-readable storage medium having stored thereon processor-executable instructions configured to cause a three-dimensional (3D) translator device processor to perform operations comprising:
    capturing a two-dimensional (2D) image with a photographic sensor;
    creating a color histogram of the captured 2D image;
    generating a topological rendering of the color histogram; and
    translating the topological rendering of the color histogram into the 3D touch surface coordinate data set; and
    actuating a 3D touchpanel into a 3D shape based on the 3D touch surface coordinate data set.

41. A non-transitory processor-readable storage medium having stored thereon processor-executable instructions configured to cause a three-dimensional (3D) translator device processor to perform operations comprising:
    capturing a two-dimensional (2D) image with a photographic sensor;
    performing edge detection of the 2D image;
    obtaining edge detection information based on the performed edge detection of the 2D image;
    translating the edge detection information into a 3D touch surface coordinate data set; and
    actuating a 3D touchpanel into a 3D shape based on the 3D touch surface coordinate data set.

42. A non-transitory processor-readable storage medium having stored thereon processor-executable instructions configured to cause a three-dimensional (3D) translator device processor to perform operations comprising:
    capturing stereoscopic images with stereoscopic photographic sensors;
    determining 3D characteristics of the captured stereoscopic images;
    translating the 3D characteristics into a 3D touch surface coordinate data set; and
    actuating a 3D touchpanel into a 3D shape based on the 3D touch surface coordinate data set.

43. A non-transitory processor-readable storage medium having stored thereon processor-executable instructions configured to cause a three-dimensional (3D) translator device processor to perform operations comprising:
    capturing a two-dimensional (2D) image with a photographic sensor;
    determining whether the captured 2D image is a 3D meta-element;
    determining whether the 3D meta-element is a link to 3D rendering instructions when it is determined that the 2D image is a 3D meta-element;
    determining whether the 3D translator device is able to follow the link when it is determined that the 3D meta-element is a link to 3D rendering instructions;
    actuating the 3D touchpanel based on the 3D rendering instructions when it is determined that the 3D translator device is able to follow the link; and
    generating a 3D touch surface coordinate data set based on the 3D meta-element and actuating the 3D touchpanel based on the generated 3D touch surface coordinate data set when it is determined that the 3D meta-element is not a link to 3D rendering instructions.

44. The non-transitory processor-readable storage medium of claim 43, wherein the stored processor-executable instructions are configured to cause the 3D translator device processor to perform operations such that actuating the 3D touchpanel based on the 3D rendering instructions comprises:

accessing an online repository of 3D rendering instructions through the link;

retrieving 3D rendering instructions from the online repository; and actuating the 3D touchpanel based on the retrieved 3D rendering instructions.

45. The non-transitory processor-readable storage medium of claim 43, wherein the stored processor-executable instructions are configured to cause the 3D translator device processor to perform operations further comprising:

determining whether the 3D meta-element enables the 3D translator device to actuate the 3D touchpanel when it is determined that the 3D meta-element is not the link to 3D rendering instructions or that the 3D translator device is unable to follow the link;

generating a 3D representation of the 2D image obtained with the photographic sensor when it is determined that the 3D meta-element does not enable the 3D translator device to actuate the 3D touchpanel; and actuating the 3D touchpanel based on the 3D meta-element when it is determined that the 3D meta-element enables the 3D translator device to actuate the 3D touchpanel.

46. The non-transitory processor-readable storage medium of claim 45, wherein the stored processor-executable instructions are configured to cause the 3D translator device processor to perform operations such that generating a 3D representation of the 2D image obtained with the photographic sensor comprises:

translating the 3D meta-element into the 3D touch surface coordinate data set; and actuating the 3D touchpanel based on the 3D touch surface coordinate data set.

47. The non-transitory processor-readable storage medium of claim 43, wherein the stored processor-executable instructions are configured to cause the 3D translator device processor to perform operations further comprising:

receiving a 3D touch input on the 3D touchpanel;

converting the 3D touch input into a 2D touch input; and communicating the 2D touch input.

48. The non-transitory processor-readable storage medium of claim 47, wherein the stored processor-executable instructions are configured to cause the 3D translator device processor to perform operations such that converting the 3D touch input into a 2D touch input comprises performing at least one of the following to communicate the 2D touch input to a 2D touchscreen device:

actuating one or more mechanical fingers configured to touch a location of the 2D touchscreen device's touchpanel that corresponds with the location of the 3D touch input;

sending a signal to the 2D touchscreen device indicating the location on the 2D touchscreen device's touch panel corresponding with the 3D touch input; and actuating an e-stim that creates a simulated 2D touch input at the location on the 2D touchscreen device's touchpanel corresponding with the 3D touch by changing electrical properties at the location.

49. The non-transitory processor-readable storage medium of claim 47, wherein the stored processor-executable instructions are configured to cause the 3D translator device processor to perform operations further comprising:

determining whether the 3D touch input was received on an actionable 3D shape; and actuating the 3D touchpanel when it is determined that the 3D touch input was received on the actionable 3D shape.

50. The non-transitory processor-readable storage medium of claim 49, wherein the stored processor-executable instructions are configured to cause the 3D translator device processor to perform operations such that actuating the 3D touchpanel comprises:

determining the 3D movement of the actionable 3D shape; and actuating the actionable 3D shape in a manner consistent with the determined 3D movement.

51. The non-transitory processor-readable storage medium of claim 40, wherein the 3D translator device further comprises a display panel, and wherein the stored processor-executable instructions are configured to cause the 3D translator device processor to perform operations further comprising displaying the 2D image on the display panel.

* * * * *